(12) United States Patent
Zguris et al.

(10) Patent No.: US 7,144,633 B2
(45) Date of Patent: Dec. 5, 2006

(54) GLASS COMPOSITIONS

(75) Inventors: George Zguris, Canterbury, NH (US); John Windisch, Corvallis, OR (US); Patrick Svoboda, Philomath, OR (US); Yuri Vulfson, Corvallis, OR (US)

(73) Assignee: Evanite Fiber Corporation, Corvallis, OR (US)

( * ) Notice: Subject to any disclaimer, the term of this patent is extended or adjusted under 35 U.S.C. 154(b) by 78 days.

(21) Appl. No.: 10/896,432

(22) Filed: Jul. 21, 2004

(65) Prior Publication Data

US 2005/0003726 A1    Jan. 6, 2005

(51) Int. Cl.
- B32B 17/06 (2006.01)
- C03C 3/076 (2006.01)
- C03C 13/00 (2006.01)
- C03C 3/102 (2006.01)

(52) U.S. Cl. .................. 428/432; 428/432; 501/35; 501/55; 501/60

(58) Field of Classification Search .............. 501/37, 501/35, 55, 72, 95.1, 57, 58, 59, 65–71; 428/432, 428/426

See application file for complete search history.

(56) References Cited

U.S. PATENT DOCUMENTS

| | | | |
|---|---|---|---|
| 2,726,161 A * | 12/1955 | Warren et al. ............. 501/34 |
| 2,774,675 A | 12/1956 | Slayter |
| 2,870,030 A | 1/1959 | Stradley et al. |
| 3,272,657 A | 9/1966 | Zenczak |
| 3,391,055 A | 7/1968 | Veres |
| 3,419,403 A | 12/1968 | Searight et al. |
| 3,450,571 A | 6/1969 | Zenczak |
| 3,560,177 A * | 2/1971 | De Lajarte et al. .......... 65/472 |
| 3,732,181 A | 5/1973 | Ray et al. |
| 3,845,737 A | 11/1974 | Heussy et al. |
| 3,892,620 A | 7/1975 | Heussy |
| 3,989,579 A | 11/1976 | Sheldon |
| 4,113,927 A | 9/1978 | Johnson et al. |
| 4,233,379 A * | 11/1980 | Gross et al. ............... 429/247 |
| 4,237,083 A | 12/1980 | Young et al. |
| 4,472,030 A | 9/1984 | Tachibana et al. |
| 4,522,876 A * | 6/1985 | Hiers .................. 442/388 |
| 5,091,275 A | 2/1992 | Brecht et al. |
| 5,180,647 A | 1/1993 | Rowland et al. |
| 5,304,516 A | 4/1994 | Clifford |
| 5,753,571 A | 5/1998 | Donohue |

(Continued)

FOREIGN PATENT DOCUMENTS

DE    1 298 680    5/1964

(Continued)

OTHER PUBLICATIONS

Lam et al., "Influence of Residual Elements in Lead and Expander Materials on the Oxygen- and/or Hydrogen-Gassing Rates of Lead-Acid Batteries," Investigation Report ET/IR448R, ALABC Project N 3.1, 30 pp. (Jul.-Dec. 2001).

(Continued)

*Primary Examiner*—Jennifer C. McNeil
*Assistant Examiner*—G. Blackwell
(74) *Attorney, Agent, or Firm*—Klarquist Sparkman, LLP

(57) ABSTRACT

Disclosed are glass compositions, glass fiber compositions, glass fiber battery separators, glass fiber filter media, battery additives and active materials formed with glass compositions disclosed, glass fiber radiation shields, and glass fiber paper compositions. Certain embodiments include, among other components, bismuth oxide. Certain embodiments include about 0.5–30% bismuth oxide of the composition by weight and silica oxide at about 54–70% of the composition by weight. Embodiments may also include other components. For example, zinc oxide can make up about 0.01–3% of the composition by weight.

23 Claims, 11 Drawing Sheets

Viscosity curves for new C-2 and different commercial glasses.

U.S. PATENT DOCUMENTS

| | | |
|---|---|---|
| 5,962,355 A | 10/1999 | Mattson |
| 5,985,488 A | 11/1999 | Mitate et al. |
| 6,261,335 B1 | 7/2001 | Kern et al. |
| 6,403,507 B1 | 6/2002 | Naumann et al. |
| 6,531,248 B1 | 3/2003 | Zguris et al. |
| 6,656,861 B1 | 12/2003 | Bauer et al. |
| 2004/0091777 A1 | 5/2004 | Lam et al. |
| 2004/0093704 A1 | 5/2004 | Marlow |
| 2004/0094379 A1 | 5/2004 | Jahns et al. |
| 2004/0095249 A1 | 5/2004 | Zaccaria |
| 2004/0096670 A1 | 5/2004 | Zguris et al. |
| 2004/0096711 A1 | 5/2004 | Zinser et al. |

FOREIGN PATENT DOCUMENTS

| | | |
|---|---|---|
| EP | 439 788 | 8/1991 |
| JP | 1071060 | 0/1989 |
| JP | 61096659 | 5/1986 |
| JP | 61128459 | 6/1986 |
| JP | 63048744 | 3/1988 |
| JP | 4073863 | 3/1992 |
| JP | 5151947 | 6/1993 |
| JP | 5283053 | 10/1993 |
| JP | 6223798 | 8/1994 |
| JP | 6302313 | 10/1994 |
| JP | 7029560 | 1/1995 |
| JP | 7201310 | 8/1995 |
| JP | 8195194 | 7/1996 |
| JP | 9082303 | 3/1997 |
| JP | 9092252 | 4/1997 |
| JP | 9134716 | 5/1997 |
| JP | 11016560 | 1/1999 |
| JP | 11260335 | 9/1999 |
| JP | 11307074 | 11/1999 |
| JP | 2000268796 | 9/2000 |
| JP | 2001176481 | 6/2001 |
| JP | 2002110124 | 4/2002 |
| JP | 2002151033 | 5/2002 |
| JP | 2002151034 | 5/2002 |
| JP | 2002216733 | 8/2002 |
| JP | 2002304977 | 10/2002 |
| JP | 2003017030 | 1/2003 |
| WO | WO 95/09131 | 4/1995 |
| WO | WO 01/46078 | 6/2001 |
| WO | WO 03/009029 | 1/2003 |
| WO | WO 03/022764 | 3/2003 |
| WO | WO 03/022766 | 3/2003 |
| WO | WO 04/011379 | 2/2004 |

OTHER PUBLICATIONS

Lam et al., "Influence of Residual Elements in Lead on the Oxygen- and/or Hydrogen-Gassing Rates of Lead-Acid Batteries," Investigation Report ET/IR526R, ALABC Project N 3.1, Final Report, 62 pp. (Jul. 2000-Jun. 2002).

"Bismuth—History, Backround," Download from www.resource-world.net on Jul. 15, 2002, 11 pp.

"Visit to Exide Technologies, R&D Center, Azuquecade Henares, Sep. 17 2002" Memo, Hollingsworth & Vose Company, A.K. Nicholson Research Laboratory, New Business Development Unit, 3 pp. (Sep. 17, 2002).

Lam et al., "Failure mode of valve-regulated-acid batteries under high-rate partial-state-of-charge operation," 10th Asian Battery Conference, 29 pp. (Sep. 3-5, 2003).

Lam et al., Presentation of "Influence of plate-processing conditions, electrolyte concentration and trace elements on the performance of VRLA batteries at high temperatures and under high-rate partial-state-of-charge operation," given at the 10th Asian Battery Conference, 25 pp. (Sep. 3-5, 2003).

Lam et al., "Influence of plate-processing conditions, electrolyte concentration and trace elements on the performance of valve-regulated lead-acid batteries at high temperatures and under high-rate partial-state-of-charge operation," Investigation Report ET/IR671R, ALABC Prject TE-1, 32 pp. (Aug. 2003-Jan. 2004).

Osumi et al., "Development of additives in negative active material to suppress sulfation during high-rate-partial-state of charge," Progress Report No. 2, ALABC Project No. N5.2, 25 pp. (Mar. 30, 2004).

Nonwovens—Theory, Process, Performance & Testing Chapter 1: An Overview of Nonwovens and Chapter 2: Nonwoven Terminology, TAPPI Press, Atlanta, Georgia, pp. 1-10 and 14 (1993).

Witkowska, A. et al., "A Molecular Dynamics Study of Lead-Bismuth-Silicate Glasses," IEEE Transactions on Dielectrics and Electronic Insulation, vol. 8, No. 3, pp. 385-389 (Jun. 2001).

* cited by examiner

Notes: 12-UAC is 1.2 micron fibers C-1 composition; 12-UBC is C-3; 12-UCC is C-2; 12UDC is C-4

Notes: 12-UAC is 1.2 micron fibers C-1 composition; 12-UBC is C-3; 12-UCC is C-2; 12UDC is C-4

Notes: 08-UAC is 0.8 micron fibers C-1 composition; 08-UBC is C-3; 08-UCC is C-2; 08-UDC is C-4; 08-UEC is C-5

GLASS COMPOSITIONS

CROSS REFERENCE TO RELATED APPLICATION

Priority is claimed from provisional patent application No. 60/399,583, filed Jul. 29, 2002, patent application Ser. No. 10/630,546, filed Jul. 29, 2003, and PCT patent application number PCT/US03/23695, filed Jul. 29, 2003, all of which are also incorporated herein by reference.

FIELD

Disclosed are bismuth-containing glass compositions, glass fibers formed from the glass compositions, and applications of the same.

BACKGROUND

Glass can be manufactured into fibers as, e.g., continuous, semi-continuous or blown fibers. Textile fibers may be manufactured by, for example, a direct melt or a marble melt process. The melted glass may be fed to a dedicated bushing typically constructed of a platinum-rhodium alloy. A molten glass stream is passed through an orifice and is cooled to form continuous fibers. Methods of making such fibers may be found in the Engineered Materials Handbook, Vol. 4, Ceramics and Glasses by ASM International (1991), incorporated herein by reference.

Another class of glass fibers is commonly referred to as glass wool or microglass fibers. Microglass fibers may be manufactured, for instance, by well-known manufacturing methods, known as the rotary method and the flame blown method. Another well-known and widely used method is the CAT method, which is a modification of the rotary method. Manufacturing glass by these methods requires heating glass compositions past their melting temperatures into a working temperature range. Typical glass compositions used in making glass fibers have melting temperatures of about 1260 to 1500° C. and working temperatures (temperature ranges between glass viscosity 100 and 10000 poise) of about 920 to 1500° C. Existing compositions have relatively narrow working ranges, making the forming of glass fibers of desirable diameters and lengths difficult because it is difficult to maintain the glass compositions in the workable range. Additionally, the relatively high melting temperatures require large amounts of energy to melt the compositions, which can be very costly.

In addition, typical glass compositions used for making glass fibers have liquidus temperatures 800 to 1000° C. The liquidus temperature of typical compositions used for making glass fibers limits the useful life of fiberization equipment due to the high temperatures at which the equipment must operate. This is especially true when a spinner disc is employed in the fiberization equipment. A glass composition having a relatively low liquidus temperature also is useful for reducing or preventing crystallization of the glass during the fiberization process.

Glass fibers are used in a variety of applications. For such applications glass fibers may be formed into a mat structure. A glass fiber mat is a nonwoven, woven, paper, or textile, made of glass fibers bonded or interlocked together by mechanical, chemical, thermal, or solvent means. Glass fiber mats may comprise only glass fibers or may include other materials as suitable to meet the application specifications.

For example, glass fibers are used in several manners in batteries. Glass fibers are typically used as a separator that is preferably inserted between negative and positive plates of the battery. In addition, glass fibers are used as one of the materials for the active material paste used for the negative or positive plates of a battery. The chemically reactive material (or active material paste) is positioned at the positive or negative electrode to engage in the charge and discharge reactions. Further, glass fibers may be used as a pasting paper that is applied to the surface of the plates to reduce the liberation of lead dust during manufacture and/or to keep plates from sticking together during the curing process.

Glass fibers tend to become brittle in humid environments, leach favorable and unfavorable components, and are unstable in acidic and/or alkaline environments. These characteristics of certain glass fibers can limit their usefulness in applications such as battery separators or filters. Ion leaching, for example, is a glass fiber surface phenomenon based on the glass composition. The amount of ions lost from a glass fiber is proportional to the exposed surface area and the glass composition. Surface area considerations are typically greatest for glass fibers having diameters of less than about 5–7 μm. In some glass fibers certain metal oxide impurities (e.g., platinum oxide, iron oxide) leach out of the fibers and have a detrimental effect on the life of the battery.

SUMMARY

Disclosed are glass compositions, glass fibers formed of certain of the glass compositions and glass fiber products formed of certain of the glass fibers and/or glass compositions. Particular embodiments of the disclosed compositions and fibers have broad working temperature ranges and relatively low melting temperatures that can prolong the useful life of fiberization equipment and decrease the costs associated with producing glass fibers. Moreover, particular embodiments of the disclosed compositions and fibers have good acid and/or alkaline resistance and include beneficial ions, such that when leaching does occur, the leached ions have a positive effect in the particular application in which the fibers are used, such as in a battery separator. In addition, certain embodiments of the glass compositions and/or glass fibers have beneficial physical properties regarding absorbing and/or blocking various wave lengths of energy, e.g., X-rays.

Certain embodiments of the glass compositions include, among other components, bismuth oxide. Certain embodiments of the glass composition include about 0.5–30 wt % bismuth oxide of the composition by weight and silica oxide at about 54–70% of the composition by weight. Embodiments of the glass compositions may also include other components. For example zinc oxide can make up about 0.01–5% of the composition by weight.

DETAILED DESCRIPTION

Figure 1:
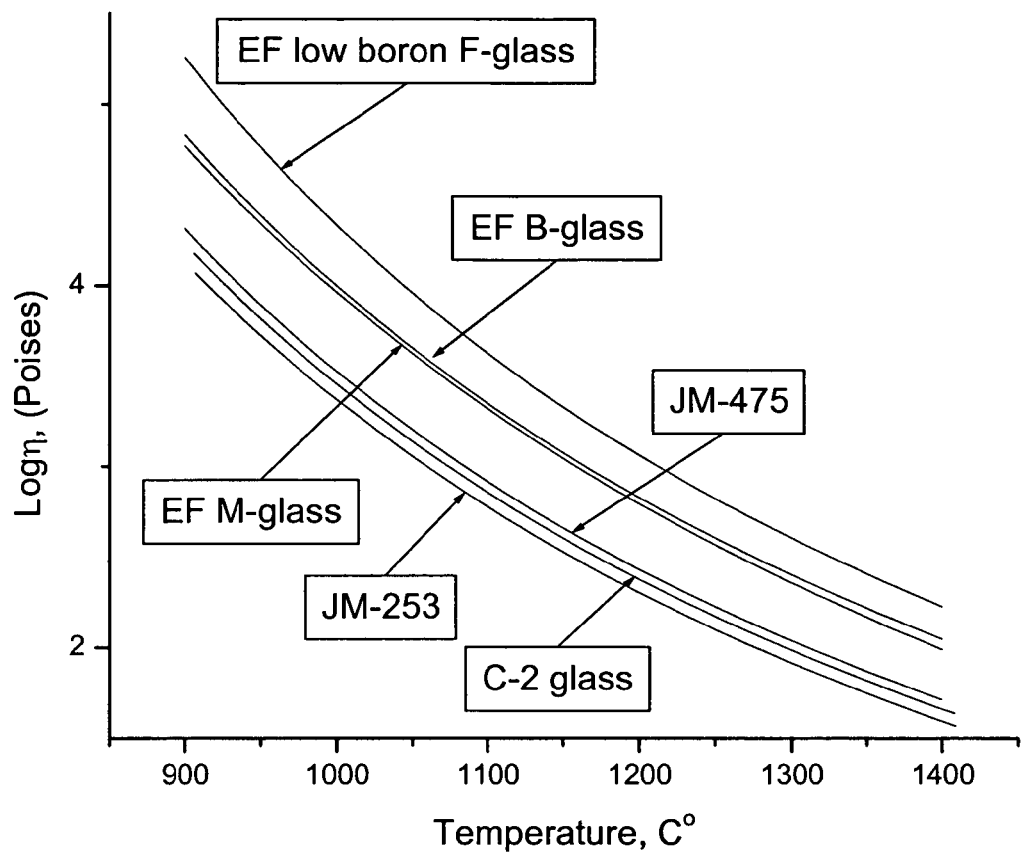
FIG. 1 is a graph showing viscosity curves for various glass compositions.
Figure 2A:
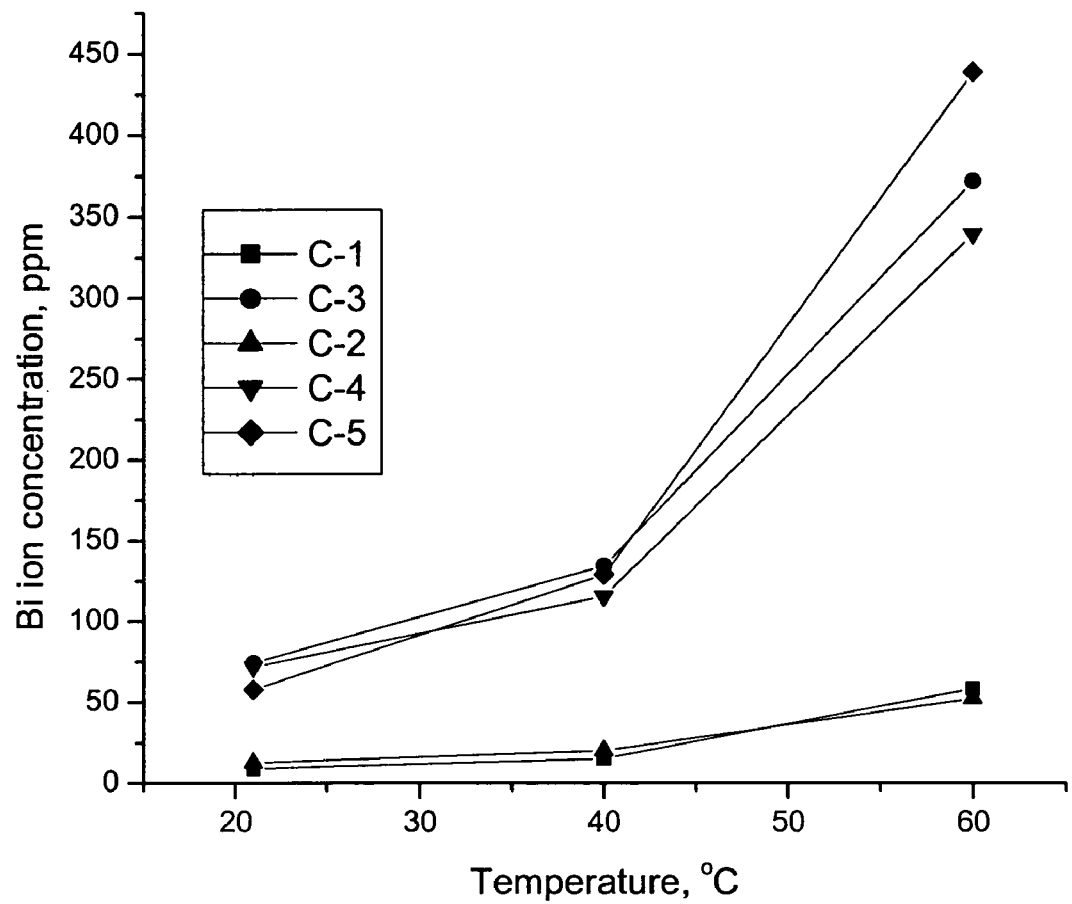
FIGS. 2A–2D are graphs illustrating bismuth ion concentrations in leachates of particular glass fiber compositions soaked in sulfuric acid baths at various concentrations and at particular temperatures.
Figure 2B:
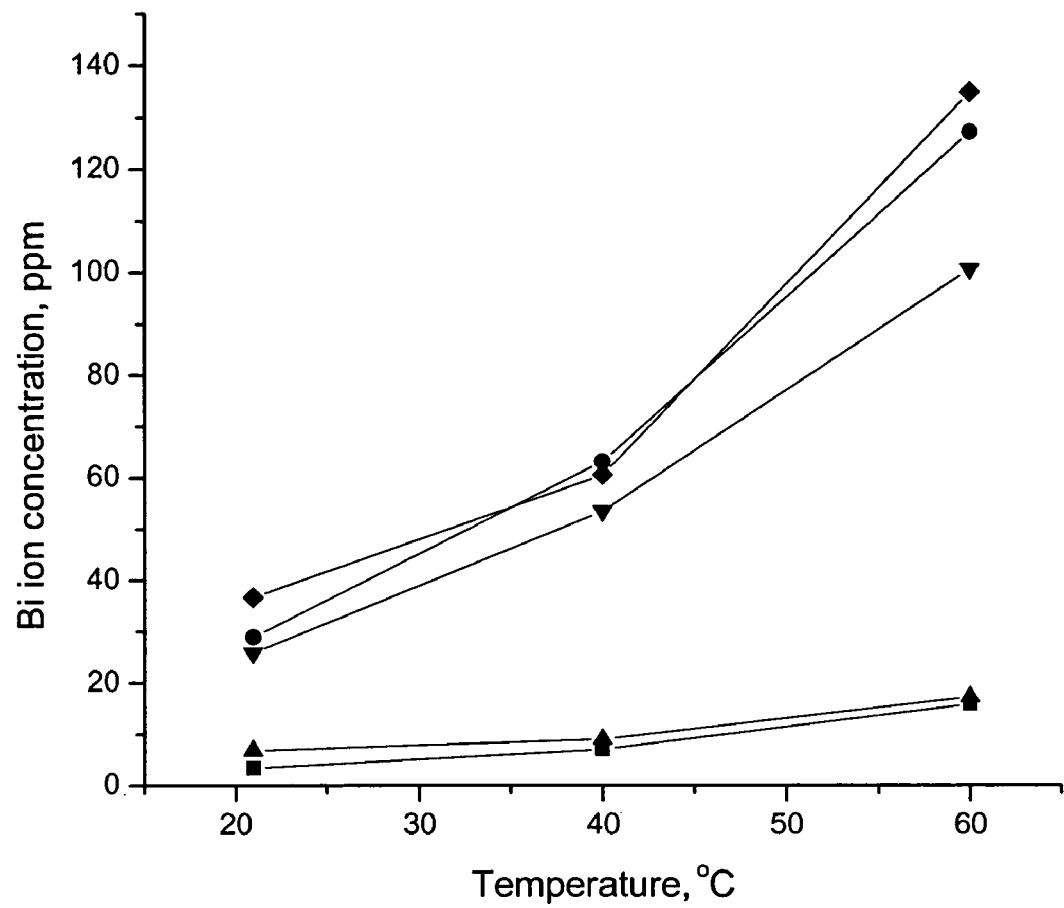
Figure 2C:
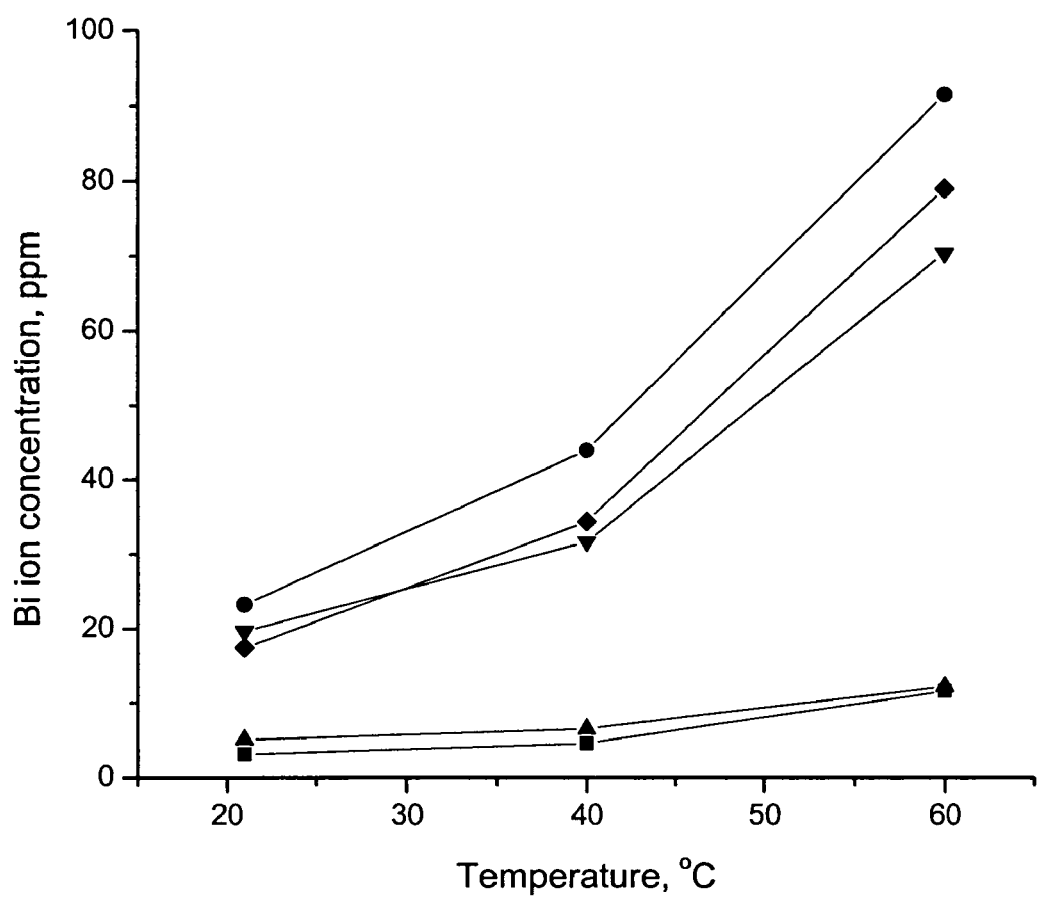
Figure 2D:
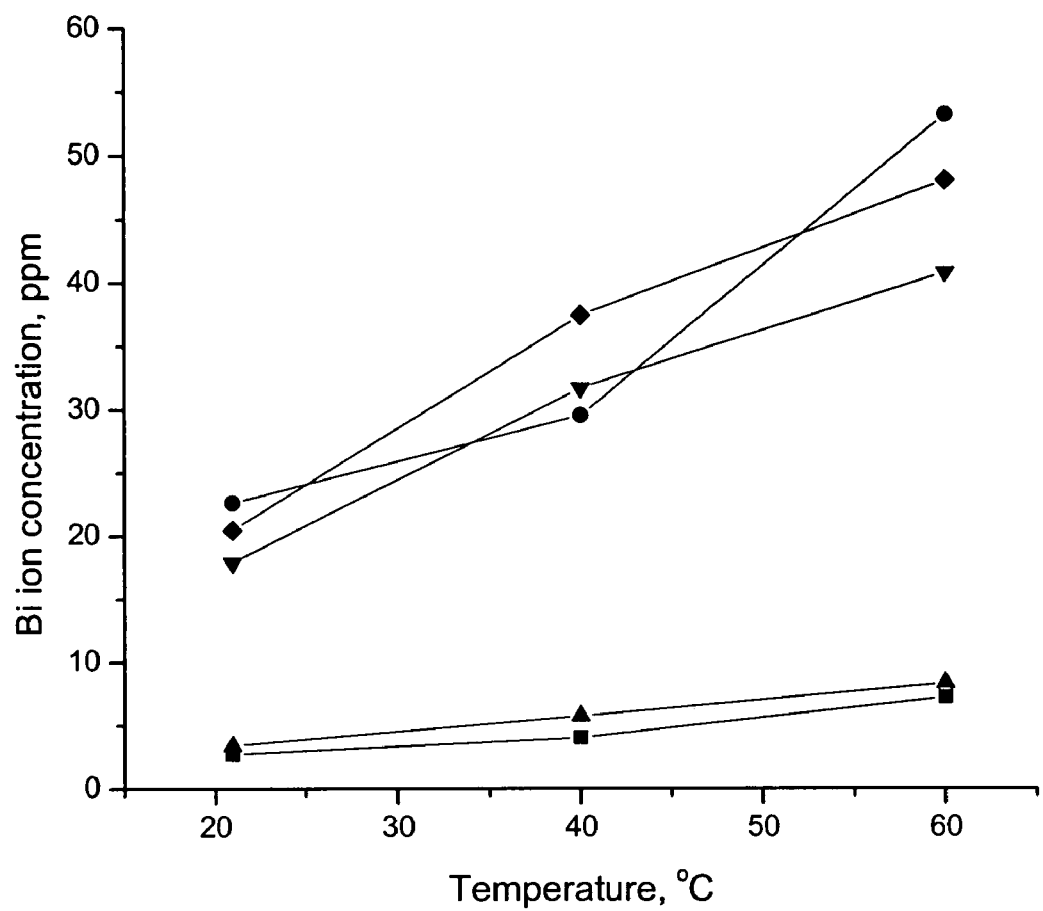

Disclosed are glass compositions including, among other components, bismuth and/or bismuth compounds. The disclosed glass compositions are the compositions of the glass at the molten stage, which composition is the same as that of resulting glass fibers formed from such glass compositions. The disclosed glass compositions may vary from example "ingredient lists" for forming such glass compositions as certain ingredients may change form once melted, becoming a part of the glass composition. Example glass composition ingredient lists are set forth below with the discussion of example methods for making particular embodiments of the disclosed glass compositions.

Embodiments of the disclosed glass compositions may comprise one or more of the following components within, e.g., ranges set forth in Table 1.

TABLE 1

| Glass Composition Component | Weight Percent |
| --- | --- |
| $SiO_2$ | 50–75 |
| $Al_2O_3$ | 1–5 |
| $Bi_2O_3$ | 0.5–30 |
| CaO | 3–7 |
| MgO | 1–5 |
| $B_2O_3$ | 4–9 |
| $K_2O$ | 0–3 |
| $Na_2O$ | 9–20 |
| NiO | 0–2 |
| ZnO | 0–5 |
| BaO | 0–5 |
| $ZrO_2$ | 0–3 |
| $Ag_2O$ | 0–1 |
| $Li_2O$ | 0–1 |
| $F_2$ | 0–1 |

Further embodiments of the disclosed glass compositions may comprise one or more of the following components within, e.g., ranges set forth in Table 2.

TABLE 2

| Glass Composition Component | Weight Percent |
| --- | --- |
| $SiO_2$ | 56–69 |
| $Al_2O_3$ | 2–4 |
| $Bi_2O_3$ | 1–15 |
| CaO | 3–6 |
| MgO | 2–4 |
| $B_2O_3$ | 4–7 |
| $K_2O$ | 0.1–1.5 |
| $Na_2O$ | 12–18 |
| NiO | 0–1 |
| ZnO | 0–3 |
| BaO | 0–2 |
| $ZrO_2$ | 0–3 |
| $Ag_2O$ | 0–0.1 |
| $Li_2O$ | 0–0.3 |
| $F_2$ | 0–0.8 |

Particular embodiments of the glass compositions may comprise, for example, the components as set forth in Table 3.

TABLE 3

| Glass Composition Component | C-1 | C-2 | C-3 | C-4 | C-5 | C-6 | C-7 |
| --- | --- | --- | --- | --- | --- | --- | --- |
| $SiO_2$ | 64 | 63.6 | 59.8 | 59.5 | 56.7 | 68.5 | 68.5 |
| $Al_2O_3$ | 3.4 | 3.3 | 3.2 | 3.2 | 3 | 3.8 | 3.8 |
| CaO | 5.5 | 5.6 | 5.1 | 4.8 | 4 | 5.7 | 5.7 |
| MgO | 2.7 | 2.6 | 2.4 | 2.0 | 2.4 | 2.8 | 2.8 |
| $B_2O_3$ | 5.4 | 5.1 | 4.7 | 4.5 | 4.5 | 4.7 | 4.7 |
| $K_2O$ | 0.8 | 0.7 | 0.6 | 0.7 | 0.7 | 1.8 | 1.8 |
| $Na_2O$ | 16 | 14.7 | 14.3 | 13.4 | 12 | 11.9 | 11.9 |
| ZnO | 0.05 | 2.0 | 0.01 | 2.0 | 1.9 | 2* | 0 |
| BaO | 0.05 | 0.02 | 0.01 | 0.01 | BDL | BDL | BDL |
| $F_2$ | 0.6 | 0.6 | 0.6 | 0.6 | BDL | 0.8 | 0.8 |
| $Li_2O$ | 0.0009 | 0.008 | 0.007 | BDL | BDL | BDL | BDL |
| $Bi_2O_3$ | 1.8 | 1.8 | 9.3 | 9.3 | 14.9 | 2* | 10* |
| $Fe_2O_3$ | 0.05 | 0.05 | 0.05 | 0.05 | 0.05 | BDL | BDL |
| $Cr_2O_3$ | BDL | BDL | BDL | BDL | BDL | BDL | BDL |
| $TiO_2$ | 0.025 | 0.021 | 0.024 | 0.025 | 0.019 | BDL | BDL |
| $ZrO_2$ | 0.004 | 0.002 | 0.003 | 0.003 | 0.002 | BDL | BDL |

Amounts in wt % over 100%;
BDL indicates below detection limit.

The disclosed glass compositions can be formulated using a variety of sources for each desired component. For example, the following glass composition components can be obtained from the sources listed in Table 4.

TABLE 4

| Glass Composition Component | Example Source | Source Composition |
| --- | --- | --- |
| $SiO_2$ | Sand (or Silica) | Sand contains 99.4% silica, 0.25% alumina; Silica contains 99.9% silica |
| $Al_2O_3$ | Syenite | $SiO_2$, $Al_2O_3$, $K_2O$, $Na_2O$, CaO |
| CaO | Burnt Dolomite (or Fluorspar) | CaO*MgO, $CaF_2$ |
| MgO | Burnt Dolomite | CaO*MgO |
| $B_2O_3$ | Borax | $Na_2B_4O_7 \cdot 5H_2O$ |
| $K_2O$ | Syenite | $K_2CO_3 \cdot 1.5H_2O$ |
| $Na_2O$ | Soda Ash or Borax | $Na_2CO_3$ $Na_2B_4O_7 \cdot 5H_2O$ |
| ZnO | Zinc oxide | ZnO |
| BaO | Barium carbonate | $BaCO_3$ |
| $F_2$ | Fluorspar | Ca $F_2$ |
| $Li_2O$ | Lithium carbonate | $Li_2O$ |
| $Bi_2O_3$ | Bismuth oxide | $Bi_2O_3$ |
| $Fe_2O_3$ | Impurity | Typically from sand, syenite and dolomite |
| $Cr_2O_3$ | Impurity | Typically from sand, syenite and dolomite |
| $TiO_2$ | Impurity | Typically from sand, syenite and dolomite |

Particular exemplary embodiments of the disclosed glass compositions and ingredients for forming the same are listed in Table 5. Different sources, amounts, and combinations of glass composition components can be used to produce the glass compositions disclosed herein, as is known to those persons of ordinary skill in the art.

TABLE 5

| Glass Comp Component | Source 1 and wt % | Glass Comp 1 | Source 2 wt % | Glass Comp 2 | Source 3 wt % | Glass Comp 3 | Source 4 wt % | Glass Comp 4 | Source 5 wt % | Glass Comp 5 |
|---|---|---|---|---|---|---|---|---|---|---|
| $SiO_2$ | Sand (and syenite) 50.0 | ~64 | 50 | 63.6 | 46.9 | 59.8 | 47.0 | 59.5 | 45.2 | 56.7 |
| $Al_2O_3$ | Syenite 12.3 | 3.43 | 12.0 | 3.3 | 11.7 | 3.2 | 11.8 | 3.2 | 11.1 | 3 |
| $Na_2O$ | Soda ash 18.0 (and borax) | 16.26 | 16.9 | 14.7 | 16.7 | 14.3 | 15.5 | 13.4 | 13.6 | 12 |
| $B_2O_3$ | See above | 5.37 | 9.7 | 5.1 | 9.6 | 4.7 | 8.9 | 4.5 | 8.5 | 4.5 |
| CaO | Dolomite 6.5 (and fluorspar) | 5.47 | 6.3 | 5.6 | 5.8 | 5.1 | 4.9 | 4.8 | 6.2 | 4 |
| MgO | Dolomite (see above) | 2.72 | See above | 2.6 | See above | 2.4 | See above | 2.0 | See above | 2.4 |
| $K_2O$ | Syenite (see above) | 0.811 | See above | 0.7 | See above | 0.6 | See above | 0.7 | See above | 0.7 |
| BaO | Barium carbonate | 0.0517 | 0 | BDL | 0 | BDL | 0 | BDL | 0 | BDL |
| ZnO | Zinc oxide | 0.0477 | 1.8 | 2.0 | 0 | 0.01 | 1.8 | 1.95 | 1.6 | 2.0 |
| $Bi_2O_3$ | Bismuth oxide 1.6 | 1.8 | 1.6 | 1.8 | 8.4 | 9.3 | 8.5 | 9.3 | 13.8 | 14.9 |
| $Fe_2O_3$ | Impurity from sand, syenite and dolomite | 0.05 | Impurity | | Impurity | | Impurity | | Impurity | |
| $F_2$ | Fluorspare 1.9 | n/a | 1.9 | 0.6 | 1.6 | 0.55 | 2.1 | 0.54 | 0 | BDL |
| $Cr_2O_3$ | Impurity | BLD | Impurity | | Impurity | | Impurity | | Impurity | |
| $TiO_2$ | Impurity | 0.0246 | Impurity | | Impurity | | Impurity | | Impurity | |
| $ZrO_2$ | Impurity | 0.0043 | Impurity | | Impurity | | Impurity | | Impurity | |
| $Li_2O$ | Impurity | 0.0009 | Impurity | | Impurity | | Impurity | | Impurity | |

BDL—below the detection limit

Embodiments of the disclosed glass compositions may contain various combinations of the disclosed components listed above. Each of the disclosed glass compositions, however, include a certain amount of bismuth, typically in the form of an oxide, present in an amount of from about 0.5 wt % to about 30 wt % $Bi_2O_3$. Good results have been obtained with a bismuth component present in the composition at from about 1 wt % to about 15 wt % $Bi_2O_3$, from about 0.5 to about 7 wt % $Bi_2O_3$ For various applications, such as in batteries, glass composition embodiments have a bismuth component present in the composition at from about, 0.5 to about 15 wt % $Bi_2O_3$, 0.5 to about 2 wt % $Bi_2O_3$, 1 to about 2 wt % $Bi_2O_3$, 4 to about 9 wt % $Bi_2O_3$, 9 to about 15 wt % $Bi_2O_3$, or other amounts. It is possible that there would be negligible amount of reduction of $Bi_2O_3$ into metallic form. However, whatever form of bismuth is used for the glass composition, the raw bismuth material will likely convert into bismuth oxide upon melting of the composition.

Alone, $Bi_2O_3$ will not form glass. Bismuth oxide may be used as part of a binary glass composition. For example, bismuth oxide can be added to $SiO_2$ in a concentration up to about 50 mol %. $Bi_2O_3$ forms glass with several other oxides as well, for example $K_2O$. $Bi_2O_3$ acts in a glass composition in a manner similar to $B_2O_3$ or PbO, in that it typically decreases the glass-melting temperature and glass viscosity of the composition, and allows fiberization of the glass at lower temperatures. Bismuth oxide structural elements are incorporated into the glass matrix and act to strengthen the resulting glass structure, e.g., glass fibers.

In addition, bismuth oxide to an extent acts to decrease the glass softening point and melting temperatures (as discussed below and shown in Table 7). The fiberization temperature, i.e., the temperature at which the glass composition viscosity is about 1000 poise is also decreased in certain embodiments of the glass compositions. Particular glass composition embodiments exhibit a fiberization temperature of about equal to or lower than about 1093° C. and certain embodiments exhibit a fiberization temperature of about equal to or lower than from about 1038° C. to about 1120° C., see, e.g., Table 14. Glass composition embodiments having from about 2 to about 10 wt % $Bi_2O_3$ decrease the fiberization temperatures of the glass compositions by about 110° C. to about 38° C.

Glass compositions including the levels of $Bi_2O_3$ indicated also improve the performance of glass fibers formed into hand sheets. Testing of such hand sheets indicates that certain embodiments of the glass fibers disclosed will produce superior battery separators or filter media. That is, such applications of the disclosed glass fibers are relatively easy to manufacture and have the tensile, elongation, basis weight, water wicking characteristics and other basic characteristics similar to or better than what is presently available with commercial fibers such as M-glass (available from Evanite Fiber Company) illustrated in Tables 6 and 7 or JM 253 glass (available from Johns Manville Corporation) and shown in Table 6). Accordingly, certain embodiments of the disclosed glass compositions do not compromise major media physical characteristics needed of glass fibers formed thereof but instead additionally provide enhanced performance due to particular enhanced or new glass properties, e.g., Bi ion leaching that decreases off gassing in battery applications.

Further, particular embodiments of the disclosed bismuth-containing glass compositions have increased devitrification resistance so that they do not become crystalline during the fiberization process. Glass compositions having $Bi_2O_3$ in the disclosed ranges showed higher resistance to devitrification (see Table 7). Modified borosilicate glass, i.e., labeled as M-glass in the Table 7 is a man-made vitreous fiber as published by the Nomenclature Committee of TIMA Inc. 91, 93, incorporated herein by reference. This glass composition was used as a reference to determine effects of additions of $Bi_2O_3$ and ZnO to a glass composition. The M-glass batch (mixture of all raw materials) was formed and then divided into three parts. A first glass composition labeled "M glass" as shown in Table 7 was formed. A second glass composition was formed by adding further components including about 2 wt % ZnO and about 2 wt % $Bi_2O_3$ and a third glass composition was formed by adding about 10 wt % $Bi_2O_3$, thereby forming two particular embodiments of the disclosed glass compositions.

The addition of $Bi_2O_3$ as indicated as well as from about 1 to about 4 wt % ZnO also minimizes hydrogen gassing of VRLA batteries under float duty. Float duty is the low-rate charge used to maintain a battery in a fully charged condition in a standby application, as is known to those persons skilled in the art. ZnO in the glass compositions and resulting glass fibers formed therefrom also significantly improves water and acid durability of the glass fibers, significant for various glass fiber applications such as battery and filter uses. Other embodiments of the glass compositions include from about 0.01 to about 3 wt % ZnO, from about 0.01 to about 2 wt % ZnO, or other amounts and ranges, depending upon the desired end use of the glass compositions.

Bismuth ions in glass fibers formed from the disclosed glass compositions will also act to improve battery performance and increase battery life (as discussed below). The amount of bismuth desirable in the glass compositions is calculated so that leaching does not compromise the structural integrity of the resulting glass fibers over time. In particular applications it is desirable to have some bismuth ions (or other ions as discussed) leach into solution but the leaching should not lead to full fiber dissolution during, for example, battery operation. The amount of leaching desired can be dependent on the duty cycle required of the battery and such amounts are known to those of ordinary skill in the art. Glass fibers formed from glass compositions having from about 0.5 to about 30% bismuth oxide provide sufficient bismuth ion leaching such that the leaching does not compromise the structural integrity of the resulting glass fibers over time but sufficient ions are leached to limit or prevent hydrogen gassing in batteries.

Glass fibers formed from alternative embodiments of the glass compositions including from about 1 to about 15% bismuth oxide also provide sufficient bismuth ion leaching such that the leaching does not compromise the structural integrity of the resulting glass fibers over time but sufficient ions are leached to limit or prevent hydrogen gassing. This is especially true in valve regulated (sealed) lead acid batteries. Hydrogen gassing causes water loss, which shortens battery life and reduces performance.

Some embodiments of the glass compositions and glass fibers may include NiO or other suitable Ni ion sources. For battery applications, Ni ions increase the charge acceptance of a negative plate of lead acid batteries. On the other hand Ni may increase gassing. This negative effect may be suppressed by addition of Bi, Zn and Ag ions to the glass compositions.

Typically silica is the main glass component. Silica forms a stable, durable glass lattice and provides particular structural properties to the glass composition. In particular embodiments of the disclosed glass compositions $SiO_2$ is present at a weight % of from about 50% to about 75% or from about 54% to about 70%. In other embodiments of the disclosed glass compositions $SiO_2$ is present at a weight % of from about 56% to about 69% and yet in other embodiments of the disclosed glass compositions $SiO_2$ is present at a weight % of from about 62% to about 70%. Other amounts and ranges of $SiO_2$ may be present depending upon the desired end use of the glass compositions. Other materials can make up the balance of omitted $SiO_2$. For example, the $SiO_2$ may be mixed with compounds such as alumina oxide, magnesium oxide, calcium oxide, mixtures thereof and other suitable compounds, as known to those of ordinary skill in the art. Thus, in particular embodiments, the glass composition contains amounts of $SiO_2$ at weight percents of less than about 50%.

None of the other glass formers ($P_2O_5$, $B_2O_3$) can provide sufficiently durable (and inexpensive) glass. That is, theoretically these oxides can substitute for silica, but they are expensive and glass compositions formed thereof will likely be less durable—not sufficiently withstanding humid or acidic environments.

Alumina in a glass composition affects the glass water and acid durability. Thus, alumina may improve an embodiment of the disclosed glass fiber's performance in a humid atmosphere when used, for example, in filter applications. On the other hand, a relatively high alumina content can significantly decrease the Kdis (biological dissolution coefficient) of the glass fiber; making the glass less bio-degradable. An alumina concentration of from about 2% to about 4% has been found to be useful.

Calcium oxide (CaO) and magnesium oxide (MgO) may be present in particular glass composition embodiments to further stabilize the glass network and provide the glass with particular advantageous structural properties. CaO acts to decrease the viscosity of the glass composition and MgO acts to further slow the crystallization rate. CaO and MgO increase glass fiber biological solubility. Particular embodiments of the disclosed glass compositions include these oxides in the advantageous ratio, CaO to MgO, of about 3:2 (i.e., a molar ratio of about 1:1). Other particular embodiments include the oxides in the following amounts: CaO at from about 3 wt % to about 6 wt % and MgO at from about 2 wt % to about 4 wt %.

Certain embodiments of the glass compositions include sodium oxide ($Na_2O$) and/or potassium oxide ($K_2O$). These particular oxides may be present to aid in the decrease glass melting temperature, glass viscosity, and, respectively, to allow fiberization of the glass at lower temperatures. Addition of $Na_2O$ and $K_2O$ to some extent may aid in increases the glass durability in acids. On the other hand, both oxides may act to increase glass water and biological solubility. Embodiments of the glass compositions including both oxides may provide further advantages due to the poly alkali effect (synergistic effect). Addition of $K_2O$ may also aid in the decrease of a glass composition's propensity to the crystallization.

Certain embodiments of the glass compositions include boron oxide ($B_2O_3$) to aid in the lowering of glass melting temperature, aid in the reduction of glass viscosity, and to enhance resulting glass fiber elasticity. In addition, boron oxide may be included in the glass composition to significantly increase glass fiber biosolubility without deterioration of glass durability in water and in acid. Particular embodiments of the glass compositions include from about 4 wt % to about 7 wt % boron oxide or from about 0 to about 1 wt % boron oxide.

Certain embodiments of the glass compositions include barium oxide (BaO) to aid in the moisture resistance of resulting glass fibers and may have a positive affect on biological degradability of the resulting glass fibers.

Certain embodiments of the glass compositions include fluorine ($F_2$) and lithium oxide ($Li_2O$) in relatively small amounts (for example, less that about 1 wt %) to aid in the decrease of the glass melting temperature, to improve melt fining, and to aid in the lowering of the glass viscosity. Certain embodiments of the glass compositions include iron oxide in trace quantities since it is introduced as an impurity in the $SiO_2$, $Al_2O_3$, CaO, and/or MgO batch materials. A typical content of iron in a glass composition is from about 0.05 wt % to about 0.1 wt %. Other typical impurities include SrO, and/or MnO. Glass composition embodiments may include such oxides in amounts less than about 0.1 wt %. In general, the disclosed glass compositions include less than about 0.05 wt % $TiO_2$ or less than about 0.1 wt % $TiO_2$ (from the total amount of glass) and CoO less than 0.01 wt % or less than about 0.1 wt %. Both CoO and $TiO_2$ may have negative influence on battery operations. In general, the disclosed glass compositions may include from about 0 to about 3 weight % of $ZrO_2$ or from about 0.1 to about 3 weight % of $ZrO_2$. For improved biosolubility of the glass fibers, $ZrO_2$ can partially substitute for the $Al_2O_3$ content. Also $ZrO_2$ increases glass fiber alkali resistance. A concentration of about 0 to about 3 weight % $ZrO_2$ has been found to be especially useful, although it is not required for all applications.

One or more of the above-listed glass composition ingredients may have suitable substitutions as known to those of ordinary skill in the art. Alternative compounds and oxides may include for example, rubidium oxide as a substitute for $K_2O$. Another example may be the partial substitution of CaO with SrO or partial substitution of $Al_2O_3$ with $La_2O_3$.

The glass compositions as disclosed herein may be made by methods known to those persons of ordinary skill in the art. For example, an embodiment of the glass compositions disclosed herein may be prepared using chemical reagent-grade materials such as those listed in the tables 1–4. The ingredients to form the desired glass compositions may be, e.g., added to a clay crucible and melted at about 1350° C. or lower depending upon the exact glass composition being formed, with about a one hour dwell time at maximal temperatures. The melted glass composition may then be poured into steel molds in the shape of disks. Glass discs may then be annealed at about 600° C. and then cooled to room temperature.

As discussed above, embodiments of the glass compositions disclosed have surprisingly relatively low softening points. Particular embodiments of the glass compositions have softening points of from about 666° C. to about 686° C. and other glass compositions for use in, e.g., battery applications have softening points of less than about 703° C. The softening point is the temperature at which the viscosity of a glass composition is 10 in power 7.6 poises ($\eta = \log 7.6$). Particular embodiments of the glass compositions have glass softening points as shown in Table 7 and 9A. Softening points of the disclosed glass compositions are lower than the commercially available glass compositions as illustrated in Table 7 wherein examples of existing glass compositions labeled "M-glass" and "JM 253" have typical conventional glass composition softening points, with M-glass having a softening point at about 704° C. and JM 253 at about 668° C.

Because particular embodiments of the presently disclosed glass compositions have lower softening points, the disclosed glass compositions melt faster and require less energy to be melted and fiberized. Lower melting and fiberization temperatures promise savings in equipment due to lower wear of parts contacting melted glass and lower energy costs. Glass softening points were determined by the Littleton method (per ASTM C-388, incorporated herein by reference).

Certain of the disclosed glass compositions (C-6 and C-7) have been tested for chemical durability in various solutions, such tests using powder methods. Glass powder having a particle size in the range of from about 297 to about 590 μm (i.e., a particle fraction between mesh screen 30 and 50) was utilized to test certain of the glass compositions' properties. This approach was taken at least in part because the process of making and testing glass microfibers is long and expensive. Thus, for screenings, the powder technique was used. Small amounts (e.g., about 1 pound) of particular glass compositions were melted and then cooled and crushed into a powder so that there was a significant increase in the glass surface area. The testing included glass composition powders having particle sizes within a predetermined range. This method allows prediction of the fiber durability in different environments and solutions, namely acidic, neutral water, basic and in simulated lung fluid, eliminating time consuming and costly experimental glass fiberization processes.

For glass water durability tests, about 5 grams of a particle fraction between mesh screen 30 and 50 were placed in a 250 ml flat bottom Erlenmeyer flask with 100 ml of DI water. The mixture was boiled for about seven hours using a reflux condenser. Samples of the resulting solution were subjected to inductively coupled plasma atomic emission spectrometry (ICP) (optical emission spectrometer—model Perkin Elmer Optima 4300 DV) to determine the amount of each element present in the leachate.

For glass acid durability tests, about 5 grams of a particle fraction between mesh screen 30 and 50 were placed in a 250 ml flat bottom Erlenmeyer flask with 100 ml of 1.260 s.g. sulfuric acid. The mixture was boiled for about three hours using a reflux condenser. For glass alkali durability test, about 5 grams of a particle fraction between mesh screen 50 and 80 (177–297 μm) were placed in 250 ml flat bottom Erlenmeyer flask with 100 ml of 0.5 N solution of NaOH and 0.25 N solution of $Na_2CO_3$. The mixture was boiled for about three hours using a reflux condenser (glass alkalinity resistance test DIN 12122). Samples of the resulting solutions were subjected to inductively coupled plasma atomic emission spectrometry (ICP) (optical emission spectrometer—model Perkin Elmer Optima 4300 DV) to determine the amount of each element present in the leachate (EFC Instruction QMSI-8.2. TM.165).

The results of these tests are listed in table 9A. The initial tests proved suitability of disclosed glass compositions (C-6 and C-7) for glass fiber applications.

TABLE 6

Weight of Loss in % for 1.4 μm Diameter Glass Fibers in Various Solutions

| Composition | Solution | | |
|---|---|---|---|
| | Acid | Water | Alkali |
| 1 | 4.50 | 4.42 | 10.27 |
| 2 | 2.61 | 2.44 | 14.91 |
| 3 | 3.55 | 2.17 | 13.59 |
| 4 | 2.80 | 2.13 | 16.34 |
| 5 | 3.12 | 1.79 | 15.20 |
| M-glass | 1.57 | 2.99 | 8.43 |
| JM 253 | 3.25 | 7.40 | n/a |

Certain embodiments of the glass compositions disclosed herein provide for lower fiberization temperatures. In general, the fiberization temperatures of the disclosed glass compositions are from about 982° C. to about 1120° C. or about 38° C. lower than commercially available glass compositions. Other particular glass fiberization temperatures and comparisons to conventional glass compositions are listed in Table 14.

Certain embodiments of the glass compositions disclosed herein provide relatively very low crystallization rates, an important technological property for glass fiberization. The crystallization rate is the speed of glass devitrification at specific temperatures or temperature ranges. Crystallization rates of particular embodiments of the glass compositions disclosed were evaluated by holding glass powder in a furnace at the following temperatures (in ° C.) for about two hour dwell periods: 1000, 950, 900, 875, 850, 825, 800, and 700. Results are shown in Table 7 and 9A.

Certain embodiments of the glass compositions disclosed have significantly lower viscosities as compared to particular conventional glass compositions. As known to those of ordinary skill in the art, glass compositions' viscosity curves are important for glass processing. With reference to FIG. 1, viscosities of particular conventional glass compositions (i.e., M-glass, 475 and JM 253) and one embodiment of the disclosed glass compositions containing $Bi_2O_3$ (C-2 according to table 3) are illustrated. The embodiment of the disclosed glass compositions containing $Bi_2O_3$ (C-2) performed better than all others tested glass compositions. Specifically, with reference to FIG. 1, the M-glass, is a glass composition formed for battery applications (available from Evanite Fiber Corporation, Corvallis, OR), the EF low boron (F) glass and the B-glass (available from Evanite Fiber Corporation, Corvallis, OR), are for use in forming filters. Particular low-boron glass compositions are set forth in, e.g., U.S. Pat. No. 6,358,871, which is herein incorporated by reference.

Glass fibers used in high efficiency particulate air (HEPA) filtration media and ultra-low penetration media typically contain significant amounts of boron, e.g., from about 8 to 11 weight percent boron. The boron can be out gassed during filter use. Out gassed boron results in formation of boric acid, which has a damaging impact on printed circuit/chip manufacturing quality when the filters are used in chip manufacturing ventilation systems. Glass compositions having boron removed completely or significantly lower amounts of boron suffer from increased viscosity and liquidus temperatures making processing the glass composition into fine-diameter fibers by conventional methods unworkable. In glass compositions having barium present to compensate for low or no boron present (forming the desired low-boron glass fiber filters) have harmful effects when such glass fibers are used in battery applications. Certain of the glass fiber compositions disclosed herein use bismuth as a substitute for the boron characteristics without the use of barium, producing a glass fiber composition that can be used in low-boron HEPA and ULPA applications while also being acceptable for use in battery applications. Table 6A shows one example composition of a low-boron/low-barium, bismuth containing glass composition.

TABLE 6A

| Glass Composition Component | Weight Percent |
| --- | --- |
| $SiO_2$ | 54–70 |
| $Al_2O_3$ | 1–5 |
| $Bi_2O_3$ | 3–30 |
| CaO | 3–7 |
| MgO | 1–5 |
| $K_2O$ | 0–3 |
| $Na_2O$ | 9–20 |
| ZnO | 1–5 |

TABLE 6A-continued

| Glass Composition Component | Weight Percent |
| --- | --- |
| BaO | 0–5 |
| $ZrO_2$ | 0–3 |
| $Ag_2O$ | 0–1 |
| $Li_2O$ | 0–1 |
| $F_2$ | 0–1 |

Further embodiments of the disclosed glass compositions may comprise one or more of the components, within, e.g., the ranges, set forth in Table 6B.

TABLE 6B

| Glass Composition Component | Weight Percent |
| --- | --- |
| $SiO_2$ | 56–69 |
| $Al_2O_3$ | 2–4 |
| $Bi_2O_3$ | 5–15 |
| CaO | 3–6 |
| MgO | 2–4 |
| $K_2O$ | 0.1–1.5 |
| $Na_2O$ | 12–18 |
| NiO | 0–1 |
| ZnO | 0–3 |
| BaO | 0–2 |
| $ZrO_2$ | 0–5 |
| $Ag_2O$ | 0–0.1 |
| $Li_2O$ | 0–1.0 |
| $F_2$ | 0–0.8 |

The JM 475 glass composition is a filter glass composition and the JM 253 is a conventional battery glass composition (available from Johns Manville Company of Denver, Colo.). As illustrated in FIG. 1, the C-2 embodiment of the disclosed glass compositions has a glass viscosity that is significantly lower than the viscosity of currently available battery glass compositions (e.g., M-glass) and is very close to the viscosity curve for JM 253. Accordingly, when the goal is to have a glass processing temperature as low as possible while keeping the resulting glass fiber quality uncompromised, the disclosed C-2 glass composition shows significant advantage. And as discussed below, for use in battery applications, radiation shielding applications and other applications, the disclosed glass compositions show significantly superior characteristics as compared to currently available compositions.

As shown in Table 6, particular embodiments of the disclosed glass compositions have surprisingly superior water durability as compared with commercially available glass compositions. For example, see Table 6 wherein representative commercially available glass compositions "M-glass" and "JM 253" glass have much lower durability in water as compared to disclosed compositions (C2–C5). In addition, disclosed glass composition no. 2 has surprisingly superior tensile strength for 0.8 µm and 1.4 µm fibers, respectively, 4.3 and 3.3 pounds/inch when formed in hand sheets.

Also disclosed herein are glass fibers formed of the disclosed glass compositions. The glass compositions disclosed may be formed into, e.g., glass fibers using conventional methods and equipment. For example, the glass compositions may be fiberized by way of the various manufacturing processes such as the rotary, CAT, a modified rotary process (e.g., as shown in U.S. Pat. No. 5,076,826), flame blown processes, and chopped strand or continuous filament glass fiber processes. Glass fibers as disclosed herein may be formed from any of the multitude of embodiments of the disclosed glass compositions.

Embodiments of the disclosed glass fibers have many potential applications. They may be used, for example, in various manners and locations in batteries, to form filters designed for air and/or liquid filtration, and woven into glass cloth or fabrics, reinforced composites, an additive for batteries active material or as a reinforcement and/or radiation absorber for plastics, and as insulation material, (e.g., electrical and/or thermal insulation). Additive material may be formed from glass particles formed of certain embodiments of the disclosed glass compositions. The glass particles may be formed in various sizes such as less than about 100 µm or less than about 50 µm or less than about 7 µm average particle size, depending upon the type of battery and the type of active material used in the particular battery application. Suitable glass particle size for such applications is known to persons of ordinary skill in the art.

The desired glass fiber composition and size is determined based on the intended use for the glass fibers, as would be known to a person of ordinary skill in the art. For example, to obtain glass fibers useful in both filter and battery applications disclosed glass composition 2 (see Table 3) may be formed into about 0.8 µm and 1.4 µm glass fibers. As known to those of ordinary skill in the art, average glass fiber diameters can be in the range of from about 0.6 µm to about 8 µm, or otherwise, depending upon the intended application of the glass fibers.

Embodiments of the disclosed glass fibers typically exhibit a variety of advantageous properties. Such disclosed glass fibers have superior water and acid durability as indicated in Table 6 and superior tensile strength (hand sheets formed of such fibers showed tensile strength of about 4.3 and 3.3 pounds/inch, respectively). Such characteristics make these disclosed glass fibers suitable for a variety of papermaking (wet laid nonwovens), dry laid nonwoven processes, or woven manufacturing processes and products. These woven or nonwoven products would have utility in, e.g., battery, filter, textile, and specialty industrial end market applications. A nonwoven glass fiber mat is a manufactured sheet, web or bat of directionally or randomly oriented fibers, made by bonding or entangling fibers through mechanical, thermal or chemical means. Nonwovens typically exclude products that are woven, knitted, tufted or felted by wet milling. Paper products are considered to be nonwoven when glass fibers are used as at least a material part of the paper. See, Albin Turbak, Nonwovens: *Theory, Process, Performance, and Testing*, TAPPI Press, Chapters 1 and 2 (1993), which is incorporated herein by reference.

Certain embodiments also have relatively low biopersistance, meaning that inhaled fibers will dissolve and be eliminated more readily in the lungs. The biopersistance factor, as known to those skilled in the art, is measured by the Kdis of the glass fibers in simulated lung fluid. A glass composition or glass fiber composition having a higher Kdis value indicates a glass composition or glass fiber composition having a more desirable biopersistance characteristic. Certain embodiments of the glass fibers achieve a Kdis of as high as about 150 ng/cm$^2$ h and other embodiments may exhibit Kdis values in the range of from about 30 to about 150 ng/cm$^2$ h and certain embodiments even in the range of from about 50 to about 150 ng/cm$^2$ h.

Glass biosolubility has been tested on crushed glass particles of size 75–106 µm made from disclosed glass composition embodiments 6 and 7 in Table 3. The particles passed through sieve 140 and remained on the sieve 200 were stored in vials with simulated lung fluid (SLF) for about 96 hours at about 37° C. in a shaker. The dissolution rate was again determined based on the leachate analysis performed with an optical emission spectrometer. Leaching rates were compared based on the levels of the leached ions in solution. Results are shown in Table 9A. An embodiment of the glass composition having 10 wt % $Bi_2O_3$ doubled the glass biodissolution rate in simulated lung fluid. This indicates that a glass composition having $Bi_2O_3$ provides an increase in biosolubility without compromising other desirable properties of the glass composition. Glass biosolubility was tested for certain of the glass fiber compositions by following the well-known method given (for example) in, Russell M. Potter and Stephanie M. Mattson, "*Glass fiber dissolution in a physiological saline solution*" Glastech. Ber. 64 Nr. 1 pp. 16–28 (1991), which reference is incorporated herein by reference. Additional testing of certain embodiments of the disclosed glass fiber compositions showed such fibers have significantly higher Kdis values as compared to conventional glass fiber compositions (i.e., glass fiber compositions not including the presently disclosed amounts of bismuth). As shown in Table 9B, glass fibers made from glass compositions 1–5 (Comps 1–5 are those compositions set forth in Table 5 above) resulted in biosolubility values, as tested in SLF, of from about 2.2 to about 2.6 times that of the biosolubility of the conventional glass fibers known as "M-glass" (available from Evanite Fiber Corporation of Corvallis, Oreg.). At the same time fiber dissolution values of the disclosed glass compositions were a similar amount lower. The increase in Kdis values of the disclosed glass compositions is significant, although, the attained values are slightly lower than Kdis values of an available glass fiber known as 253 glass (available from Johns Manville Company of Denver, Colo.). Additional improvement of glass composition biosolubility is achieved by the addition of alkali and alkali-earth metal oxides.

Further, certain embodiments of the disclosed glass fibers including the levels of $Bi_2O_3$ indicated may also improve the performance of glass fibers formed therefrom because longer fibers can be produced. Certain embodiments of the glass fibers also show a significantly increased density as compared to equivalent glass fibers currently available. Accordingly, certain glass fiber products, such as glass fibers used in battery separators provide higher porosity rates in the separator because for the separator to have the same weight of glass fibers, less glass fibers are needed. The same would hold true for other glass fiber products such as filtration and insulation products where the weight of the fibers versus the amount of fibers needed is of concern. For example, certain embodiments of the disclosed glass fibers have density values from about 2.5 to about 2.8 g/cm$^3$ as shown in Table 7.

TABLE 7

| Composition No. | Glass density, g/cm$^3$ | Softening point, (° C.) | Crystallization rate |
|---|---|---|---|
| 1 | 2.558 | 678 | Slight surface crystallization- |
| 2 | 2.700 | 666 | Slight surface crystallization- |
| 3 | 2.573 | 680 | Slight surface crystallization- |
| 4 | 2.772 | 670 | Slight surface crystallization- |
| 5 | 2.804 | 674 | Slight surface crystallization- |
| M-glass | 2.489 | 704 | Surface and bulk crystallization |
| JM 253 | 2.523 | 668 | Slight surface crystallization- |

Density values of from about 2.50 to about 2.85 are obtainable with certain embodiments of the presently disclosed glass fibers when bismuth oxide concentrations of the glass fibers are from about 1 to about 15 wt %. Density values were obtained by use of a Micromeritics AccuPyc 1330 picnometer according to the method set forth in the Micromeritics manual.

Embodiments of the glass fibers disclosed herein have relatively low specific surface areas (SSAs). Relatively low SSAs of certain glass fiber embodiments are useful for glass fiber durability considerations—the larger SSA fibers' value, the smaller the fiber diameter. Different applications require glass fibers of different diameters and respectively different SSA values. SSA and fiber diameter values are inversely dependent. The larger the SSA the smaller the diameter of the fiber and the stronger the fibers when subjected to ambient atmosphere attack (e.g., humidity, acid). SSA values are especially important for glass fiber products having glass fibers of relatively large specific surface areas as larger surface areas can detrimentally affect the product. For example, ion leaching is a glass fiber surface phenomenon. The amount of ions lost from a glass fiber is proportional to the exposed surface area. Surface area considerations are typically greatest for glass fibers having diameters of less than about 5–7 μm but the SSA values of larger or smaller diameter glass fibers is also of importance. Certain embodiments of the disclosed glass fibers have SSA values of from about 1.1 to about 1.2 g/m³ for about 1.4 μm diameter fibers, from about 1.95 to about 2.0 g/m³ for about 0.8 μm diameter fibers, less than about 3 m²/g, or less than about 2 m²/g.

When reciting SSA values of certain embodiments of the disclosed glass fibers herein, the numerical representations are based on determinations made analyzing the glass fibers by the test guidelines set forth in EFCTM 157: Specific Surface Area Analysis using Nitrogen, which is incorporated herein by reference. The apparatus used was a Micromeritics 2375 BET SSA analyzer.

As mentioned above, leaching of ions from glass fibers in various glass fiber products can be advantageous or detrimental to the product. For example, with glass fiber filter products leaching would be detrimental for a variety of reasons, such as disintegration of the fibers. Leaching of the glass fibers has a direct affect on the durability of the fibers. In addition to the affect of leaching on the durability requirements of glass fibers, other considerations depend on the applications for which glass fibers are used. For example, glass fibers used in battery separators preferably have low levels of leaching of certain metal oxide impurities (e.g., platinum oxide, iron oxide) that can have a detrimental effect on the life of the battery. On the other hand, certain ions (e.g., Bi, Ag, Ni, Cd, Ge, Sn, Zn) may have a positive effects on battery performance (as discussed above), so leaching of these ions may be beneficial. As discussed, these ions can reduce gassing, water loss and improve charge acceptance by a battery's negative plate.

The durability of glass fibers is typically determined by the leaching rate of the glass fibers in acid, neutral and alkaline conditions. Particular embodiments of the disclosed glass compositions in powder form were tested for leach rates in acidic environments. Leaching rates in acid were determined by analyzing leachates obtained by boiling 1 gram of glass fibers in 100 ml of $H_2SO_4$ having a specific gravity of 1.26 g/cm³ for three hours. DI water (up to 250 ml) was added to the leachate. (See 8.2 ASTM 165, which is incorporated herein by reference.) Samples of the resulting solution were subjected to Optical Emission Spectrometer (OES) model Perkin Elmer Optima 4300 DV to determine the amount of each element present in the leachate. Final leach rate results are shown in Tables 6, 8, 10 and 18. The leach rates shown are averages of three sample tests per composition tested. Table 18 lists Bi-ion leaching constants. The leaching constant is a mass of ions in nanograms leached from the glass surface of one square centimeter into solution in one hour.

Leaching constants may be determined as follows:

0) The $Bi_2O_3$ leaching rate for 0.8 μm in diameter glass fibers for three hours in boiling 1.26 g/cc $H_2SO_4$ is from about 2000 ppm or $2\times10^6$ ng for glass compositions containing 1.8 wt % $Bi_2O_3$ and about 16000 ppm or $1.6\times10^7$ ng for glass compositions having 14.9 wt % $Bi_2O_3$ per 1 gram of glass fibers.

2) The leaching constant for $Bi_2O_3$ for above mentioned conditions was calculated according to the following equation:

$$L_{1.8} = \frac{m_1}{t \times S}$$

$$L_{14.9} = \frac{m_2}{t \times S}$$

wherein m is the mass in ng of the Bi-ions leached into solution, t is the leaching time in hours, S is the fiber surface area in cm².

3) The 0.8 μm glass fibers were formed to have specific surface areas of 2 m²/gr or 20000 cm²/gram.

4) Thus, for glass fibers formed from the C-1 glass composition (Table 3), wherein the glass fibers had an average diameter of 0.8 μm, the leaching constant is:

$$L_{1.8} = \frac{m_1}{t \times S} = \frac{2 \times 10^6 \text{ ng}}{3 \text{ h} \times 2 \times 10^4 \text{ cm}^2} = 33.3 \frac{\text{ng}}{\text{h} \times \text{cm}^2}$$

5) For glass fibers formed from C-5 glass composition (Table 3), wherein the glass fibers had an average diameter of 0.8 μm, the leaching constant is:

$$L_{14.9} = \frac{m_2}{t \times S} = \frac{1.6 \times 10^7 \text{ ng}}{3 \text{ h} \times 2 \times 10^4 \text{ cm}^2} = 266.7 \frac{\text{ng}}{\text{h} \times \text{cm}^2}$$

6) For a glass fiber composition having 1 wt % $Bi_2O_3$, the leaching constant would be equal to 18.5 ng/h×cm².

Thus, the bismuth ion leaching rate per hour from the glass surface of one square centimeter of certain embodiments of the glass fiber compositions disclosed herein is from about 15 to about 320 ng/h×cm² or from about 10 to about 250 ng/h×cm².

The acid leaching test showed that the glass composition embodiments tested have leaching rates within the range of current commercial glass fiber "408" made from M-glass (available from Evanite Fiber Corporation of Corvallis, Oreg.) and glass fibers "206" made from "253" glass (available from Johns Manville Company of Denver, Colo.). Leach rates of the embodiments of the disclosed glass compositions tested are closer to the glass fibers made out of "253 glass." All of the tested glass composition embodiments have approximately the same acid resistance with a slightly higher value shown for composition numbers 2, 4 and 5—the glass composition embodiments with ZnO and the glass compositions with the highest $Bi_2O_3$ concentration.

TABLE 8

| Composition | Leached ion concentration in ppm | | |
|---|---|---|---|
| Number* | In DI water | In acid | In Alkali (52° C.) |
| 1 | 158.6 | 230.9 | 58.3 |
| 2 | 118.2 | 210.3 | 54.0 |
| 3 | 136.7 | 239.6 | 76.8 |
| 4 | 108.6 | 233.2 | 78.2 |
| 5 | 99.9 | 193.5 | 82.0 |
| 408 (M-glass reference) | 107.4 | 110.3 | 30.7 |
| 206 (JM 253 reference) | 209.1 | 234.7 | n/a |

*The composition numbers herein correspond to those set forth above in Table 3.
**K-ions excluded Samples of the resulting solution were subjected to inductively coupled plasma atomic emission spectrometry (ICP) (optical emission spectrometer—model Perkin Elmer Optima 4300 DV) to determine the amount of each element present in the leachate. Final results shown in Tables 8 and 9A are averages of three sample tests per composition tested. Different element ion leaching rates in water for specific embodiments are shown in Table 10. Leaching rates in DI water were determined by analyzing leachates obtained by boiling 2.5 gms of glass fibers in 250 gms of DI water for 3 hours. Samples of the resulting solution were analyzed using an optical emission spectrometer model Perkin Elmer Optima 4300 DV to determine the amount of each element present in the leachate. In Table 10, Sample IDs designating compositions 1–5 are those compositions shown in Table 3. (The sample ID indicator "08" indicates a glass fiber diameter of 0.8 μm.) The element concentrations are in ppm.

Particular embodiments of the disclosed glass compositions in powder form were tested for leach rates in water or neutral environments (tests set forth above) to determine the glass fibers' moisture and water resistance values. The total ion concentrations in leachates in DI water, acid, and alkaline solutions are shown in tables 8 and 9A. Presented data is the average of three sample tests per composition tested. The tested glass composition embodiments illustrate that the resulting glass fibers have water durability performance values that are compatible with the commercially available fibers (with weight losses below about 5 wt %). Water durability performance is better for glass compositions having higher ZnO and $Bi_2O_3$ content.

Particular embodiments of the disclosed glass compositions in powder form were tested for leach rates in alkaline environments. Fiber leaching rates in a base were determined by analyzing leachates obtained by holding about 2.5 grams of glass fibers in 100 ml of 30% KOH at 52° C. for 3 hours. DI water (up to 250 ml) was added to the leachate. Resistance of the glass fiber to acid and water were tested per EFCTM 120: Extractable Metallic Impurities of Recombinant Battery Separator Mat (RBSM) and Glass Fibers. Such conditions are equivalent to the glass fibers existing for about 5 years in a battery environment. Alkalinity is tested per EFCTM 119, incorporated herein by reference. Leachates were tested per EFCTM 120 as described above.

A glass composition having about 10 wt % of $Bi_2O_3$ (composition 7, Tables 3 and 9A) has a decreased glass chemical durability (10–20%) in acid (1.26 $g/cm^3 H_2SO_4$), improved glass durability in water, and significantly increased alkali resistance in 0.5 N NaOH+0.5 N $Na_2CO_3$ water solution. Surprisingly, the glass leaching rate of composition 7 in 0.5 NaOH+0.5 $Na_2CO_3$ dropped almost three times (see Table 9A). However the same phenomenon was not shown in concentrated KOH (30%) for glass fibers made out of compositions 1–5. The 30% KOH solution appeared equally destructive for all compositions tested. Addition of 2% of $Bi_2O_3$ and 2% ZnO (composition 6, Tables 3 and 9A) did not significantly change the glass properties. However, such a composition would be very efficient for battery separators due in part to the fact that that embodiment of the glass composition contains both ZnO and $Bi_2O_3$. Increased glass fiber alkali resistance is beneficial for glass fibers used in a battery separator because during initial wrapping of the plates, the lead plates could have an alkaline pH value of about 8 to about 10. In addition, prior to formation of the battery, the density, or specific gravity of the acid electrolyte can approach that of water and result in alkaline conditions at plate.

TABLE 9A

| Glass properties | Conventional Glass | Composition 6 | Composition 7 |
|---|---|---|---|
| Glass softening point ° F. | 704° C. | 702° C. | 686° C. |
| Leached in acid, in ppm | 18 | 25 | 30 |
| Leached in DI water, ppm | 63 | 70 | 53 |
| Leached in alkaline solution, ppm | 404 | 438 | 162 |
| Leached in simulated lung fluid (SLF), in ppm in 96 hours | 27 | 29 | 40.2 |
| Estimated Kdis, $ng/cm^2$ h | 25 | 30 | 60 |
| Devitrification | Surface and bulk crystallization | Slight surface crystallization | Slight surface crystallization |

Comments: For all three compositions prepared from the same batch, then to M-composition 2 wt % of ZnO and 2 wt % $Bi_2O_3$ (% from initial batch weight) were added. For composition 7, 10 wt % of $Bi_2O_3$ was added. Glasses melted at maximal temperature 1350° C. with a dwell time of 1 hour at maximal temperature.
*Na-ions exluded

TABLE 9B

| | Composition No. | | | | | | |
|---|---|---|---|---|---|---|---|
| | C-1 | C-2 | C-3 | C-4 | C-5 | M-glass | JM 253 |
| Dissolution rate, Kdis, $ng/cm^2$ hour | 57.7 | 49.6 | 50.4 | 49.6 | 52.5 | 22.2 | 63.5 |
| Dissolution ½ time for 1 μm fibers | 26.5 | 30.8 | 30.3 | 30.8 | 29.1 | 68.7 | 24 |

TABLE 9C

| Composition Number | Intensity of transmitted light through X-ray image of one layer media. | Intensity of transmitted light through X-ray image of five layers media | Calculated single layer attenuation, $I/I_o$ | Calculated five layer attenuation, $I/I_o$ |
|---|---|---|---|---|
| C-1 | 1.08 | 1.52 | 0.94 | 0.74 |
| C-2 | 1.2 | 1.06 | 0.93 | 0.71 |
| C-3 | 0.76 | 0.46 | 0.86 | 0.48 |
| C-4 | 0.93 | 0.75 | 0.86 | 0.46 |
| C-5 | 0.84 | 0.33 | 0.80 | 0.33 |
| Reference M-glass | 1 | 1 | 0.96 | 0.81 |

Note:
Results normalized to reference media made out of 0.8 micron M-glass fibers

TABLE 10

Water leaching test results for 0.8 μm fiber media in ppm

| Sample | Al | B | Ba | Bi | Ca | Fe | K | Mg | Na | Ni | Si | Ti | Zn |
|---|---|---|---|---|---|---|---|---|---|---|---|---|---|
| 08UAC | 0.61 | 4.22 | 0.08 | 0.17 | 2.03 | BDL | 1.74 | 0.10 | 89.03 | BDL | 60.59 | BDL | 0.01 |
| 08UBC | 0.80 | 3.78 | 0.09 | 0.85 | 1.21 | BDL | 1.48 | 0.12 | 79.14 | BDL | 49.27 | BDL | BDL |
| 08UCC | 0.46 | 4.02 | 0.16 | 0.17 | 1.75 | BDL | 1.53 | 0.09 | 73.42 | BDL | 36.43 | BDL | 0.14 |
| 08UDC | 0.60 | 3.77 | 0.20 | 0.59 | 0.91 | BDL | 1.20 | 0.07 | 61.92 | BDL | 39.26 | BDL | 0.13 |
| 08UEC | 0.60 | 2.21 | 0.01 | 1.06 | 0.48 | BDL | 0.95 | 0.19 | 47.65 | BDL | 38.74 | BDL | 8.04 |

In the particular cases where the glass fiber compositions are used in battery separators, they may be used in various battery types, such as lead-acid or lithium batteries. The general functions of a separator can be found, e.g., in the Handbook of Battery Materials, edited by Jurgen O. Besenhard, Wiley-VCH, ISBN-3-527-29469-4, Chapter 9, (1999), incorporated herein by reference. The glass fibers may comprise anywhere from about 60 to about 99 weight percent or more of the total weight of the separator. In certain embodiments the glass fibers are mixed with or combined with other separator materials known to those persons of ordinary skill in the art, such as with polyester, polyolefin, wood pulp, and mixtures thereof.

Lead acid batteries include a plurality of electrode plates. The plates are arranged to establish alternating positive and negative electrodes. A battery separator may be disposed between each pair of electrodes. The separators may be formed of insulating material and are used, in part, to prevent metallic deposits in the battery from forming short circuits between the electrode plates. The separator is porous, however, to the battery electrolyte so that current can pass from one plate to another. Particular examples of battery separators and methods of making and using them are disclosed in U.S. Pat. Nos. 5,180,647; 5,091,275; 4,237,083; 4,113,927; 3,989,579; 3,845,737; 5,182,179; 4,648,177; 4,606,982; 4,081,899; and 3,450,571, all of which are incorporated herein by reference.

In examples of battery separators, glass fibers made from the disclosed glass compositions are used to form the battery separator. The glass fibers may be used to form what is commonly known as an absorptive glass mat (AGM or RBSM) separator, which typically is comprised of glass fibers of varying length and diameter. In other cases the battery separator comprises a mat formed of the disclosed glass fibers that is impregnated with a binder that is an aqueous mixture of colloidal silica particles and a sulfate salt as described in U.S. Pat. No. 5,091,275 (the '275 patent). As explained in the '275 patent, the separator can be made by forming the glass mat on a conventional paper making machine (such as a Fourdrinier machine) and then exposing the mat to the binder in an impregnating bath of an aqueous mixture of the binder, followed by drying of the mat and compression to the desired separator thickness. Dry laid fiber mats comprising glass fibers made from the disclosed glass compositions may also be used to form battery separators. The dry laid mats formed of the disclosed glass fiber compositions may be made, e.g., by conventional methods known in the art.

Battery separators comprised of particular embodiments of the disclosed glass compositions set forth in Table 3 were made and tested for performance. Batteries were tested using a series of separators comprising about 100% fine glass fibers, the fibers having about 0.8 μm average fiber diameter and being formed of the identified particular embodiments of the glass compositions disclosed herein. A series of test batteries were made for float testing.

The results of the float testing indicate that bismuth that will leach from the glass will plate onto plates in the battery. As evidenced in particular publications, e.g., Ceylan H., Haigh N. P., Manders J. E. & Lam Lan T., *Influence of bismuth on the charging ability of negative plates in lead-acid batteries,* 161 Journal of Power Sources, 107:2:155-(2002), which is incorporated herein by reference, when bismuth is added to positive and negative plates at levels of about 0.01 to about 0.06 wt. % of the paste active material, the batteries show significant improvement in cycle life under deep cycling or high rate partial state-of-charge cycling (HRPSOC). Thus, as shown in the results listed in Table 11 when using battery separators formed of fibers made from glass compositions disclosed herein, bismuth is leached from the separator onto battery plates during battery operation, which then improves the battery performance.

Likewise, ions leached from the separator (formed of glass fibers made of the disclosed glass compositions) impact the floating cell potential of a battery. For example, battery test cells were fully charged at a constant voltage of 2.45 V with a maximum current of 2.3 A for 20 h, followed by three, consecutive, 3-h capacity determinations, i.e., the cells were discharged at 4.6 A until the voltage reached 1.7 V. Recharge was conducted at a constant voltage of 2.45 V with a maximum current of 2.3 A until 10% overcharge was reached. After capacity testing, the cells were charged at a constant voltage of 2.27 V. The float current of each cell was monitored for two weeks at 25, 40 and 60° C., consecutively. The float current performances of the individual cells were tested.

During float service (e.g., telecommunications, uninterruptible power supply (UPS) systems applications), lead-acid battery cells are maintained in a charged state and are required to discharge for short periods on demand. In this condition, the charging current (i.e., float current) is mainly due to combined oxygen evolution and grid corrosion at the positive plates and/or hydrogen evolution at the negative plates in flooded-electrolyte cells. In VRLA counterparts, the charging current (i.e., float current) is mainly due to combined hydrogen and oxygen recombination at the negative plates. Oxygen and hydrogen evolution occur as side reactions during the charging process of lead-acid batteries, and give rise to water loss. In a VRLA battery cell, oxygen evolved from the positive plates diffuses through either pores of the separators or headspace of the battery container to the negative plates, where it is reduced back to water. Thus, water is preserved. Excessive oxygen evolution and its subsequent recombination can cause "thermal runaway" of a VRLA battery cell because the oxygen-recombination reaction is exothermic and is considered to be a failure mode with VRLA batteries. On the other hand, the hydrogen evolved from negative plates can only be oxidized at a very low rate, back to water at the positive plates. Thus, any hydrogen emission will translate to a permanent loss of water from the cell. Accordingly, minimization of both oxygen and hydrogen-gassing rates is desirable in VRLA batteries.

For given plate dimensions and grid composition the amplitude of the float current is affected by the saturation level of acid in the separator, the concentration of trace elements in the positive and negative plates, and the battery temperature. Trace elements in plates originate from the starting lead oxide and/or from the deposition of the elements from the electrolyte and/or from trace elements leached from the separators. To determine the effects of separators formed of various of the disclosed glass fiber compositions on battery float current, several of the disclosed glass compositions (four containing bismuth and one control) were used to form glass fibers and then battery separators and batteries were tested while maintaining the level of acid saturation, and using the same positive and negative plates.

Figure 4:
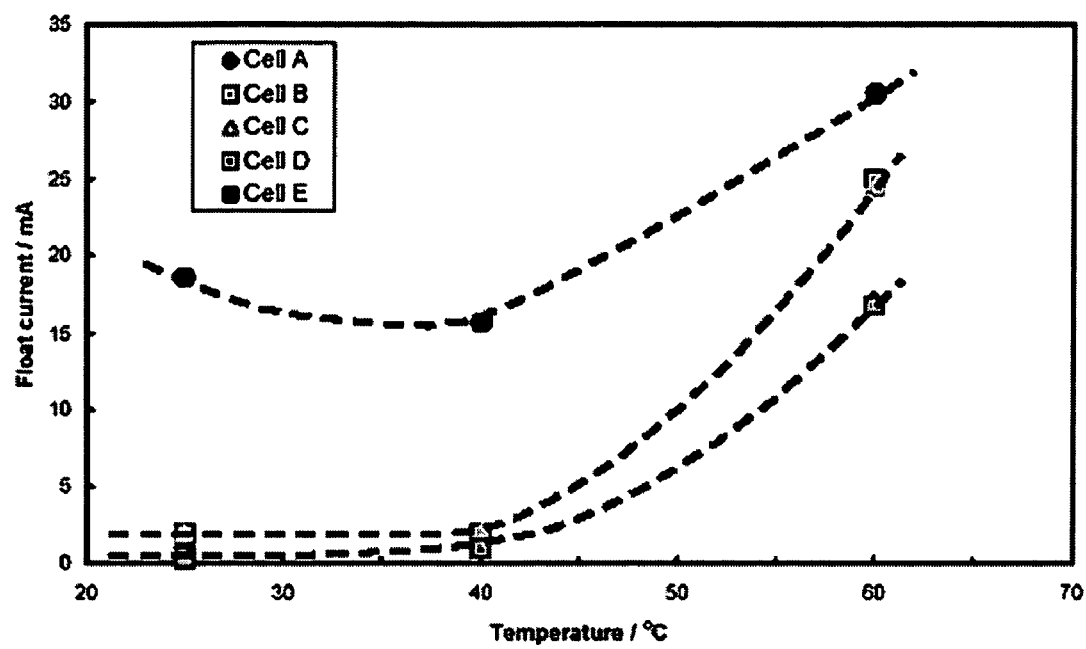
FIG. 4 illustrates a change of float current with temperature in cells assembled utilizing various embodiments of glass fiber separators.

The resulting change in float current of various VRLA cells with temperature is presented in FIG. 4. For each cell, the float current remained virtually unchanged, with an increase in temperature from about 25 to about 40° C. The float current rises with increasing temperature above about 40° C. Using separators formed of several of the disclosed glass fiber compositions on a float current showed that control (408 MCC), 08-UAC (Composition 1, Table 3), 08-UCC (composition 2, Table 3), 08UDC (Composition 4, Table 3), and 08-UEC (Composition 5, Table 3) at temperatures below or equal to about 40° C. are similar because the float currents are within the accuracy of the equipment (i.e., ±3 mA). Standard charge/discharge equipment was built and used by the testing laboratory, CSIRO Energy Technology laboratory of Victoria, Australia. Table 11 illustrates the levels of trace elements in the electrolyte and plate material before and after the float charge test (i.e., those elements leached from the separator used). As the Table 11 data illustrates, the leached bismuth from the glass fibers forming the separator(s) will plate onto the battery plates, while the zinc material does not. Table 11A lists the glass fiber compositions forming the separators tested in Cells A–E as listed in Table 11.

TABLE 11

| Sample | Elements (ppm) | | | | | |
|---|---|---|---|---|---|---|
| | Bi | Co | Cr | Fe | Ni | Zn |
| Electrolyte | | | | | | |
| Before formation After test | BDL | BDL | BDL | 0.15 | BDL | BDL |
| Cell A | BDL | BDL | 0.9 | 9.1 | 2.6 | 4.3 |
| Cell B | BDL | BDL | 0.6 | 6.2 | 1.3 | 8.7 |
| Cell C | 1.6 | BDL | 0.9 | 9.5 | 2.3 | 73.3 |
| Cell D | 0.1 | BDL | 1.6 | 6.9 | 1.3 | 102 |
| Cell E | 1.2 | BDL | 1.9 | 11.6 | 4.0 | 111 |
| Cell A | BDL | BDL | 0.9 | 9.1 | 2.6 | 4.3 |
| Positive-plate material | | | | | | |
| Before formation After test | 16 | BDL | BDL | 19 | 3.2 | 9.0 |
| Cell A | 20 | BDL | BDL | 10 | 3.3 | 8.8 |
| Cell B | 40 | BDL | BDL | 10 | 3.2 | 9.0 |
| Cell C | 150 | BDL | BDL | 10 | 3.2 | 8.9 |
| Cell D | 30 | BDL | BDL | 170 | 3.1 | 9.0 |
| Cell E | 120 | BDL | BDL | 7 | 3.2 | 9.1 |
| Negative-plate material | | | | | | |
| Before formation After test | 14 | BDL | 6.7 | 21 | 6.5 | 9.8 |
| Cell A | 20 | BDL | 6.7 | 20 | 6.4 | 10 |
| Cell B | 60 | BDL | 6.5 | 20 | 6.6 | 10 |
| Cell C | 410 | BDL | 6.6 | 20 | 6.5 | 10 |
| Cell D | 80 | BDL | 6.8 | 10 | 6.3 | 10 |
| Cell E | 390 | BDL | 6.7 | 30 | 10 | 9.7 |

BDL = below detection limit.

TABLE 11A

| Cell Tested/Table 11 | Glass Composition |
|---|---|
| Cell A | Control - M Composition 408 MCC |
| Cell B | 08-UAC (Composition 1) |
| Cell C | 08-UEC (Composition 5) |
| Cell D | 08-UCC (Composition 2) |
| Cell E | 08-UDC (Composition 4) |

Performance of battery separators made from certain embodiments of the disclosed glass fiber compositions during a battery's life-time was analyzed by subjecting certain embodiments of the glass fiber compositions to standard, hot acid soak and extraction procedures. Samples of certain glass fiber compositions in the form of a glass fiber mat having surface areas of 1345 cm$^2$ were soaked for about 20 hours at about 21° C., 40° C., and 60° C. in sulfuric acid samples of varying concentrations, namely, acids having specific gravities equivalent to about 1.1, 1.25, 1.3, and 1.35 g/cm$^3$. Battery separator media formed of glass fibers formed of conventional M-glass glass, with an average diameter of about 0.8 μm, were used as a reference. Samples of acid solutions before and after separator immersion were analyzed with an Optical Emission Spectrometer, model Perkin Elmer Optima 4300 DV) to determine the degree of leaching of elements from the glass fiber samples.

FIGS. 2A–2D show the results of analysis for concentrations of leached Bi ions from particular of the disclosed glass fiber compositions as function of acid specific density and temperature. Bismuth ion concentration is proportional to the bismuth oxide content in the glass composition solution temperature, and is inversely proportional to the specific gravity of the acid utilized. Thus, through leaching from the glass fiber compositions, particularly advantageous bismuth ion concentrations in battery electrolytes may be achieved by manipulating the bismuth oxide content in the glass composition used to form the glass fibers and by controlling battery operation temperature. For example, to achieve a desirable Bi ion leaching constant of from about 0.05 ng/cm²h to about 12.0 ng/cm²h for a temperature range of about 20 to about 60 C.°, glass fibers made from a glass composition having from about 0.5 wt % to about 15 wt % bismuth oxide could be used.

Figure 8:
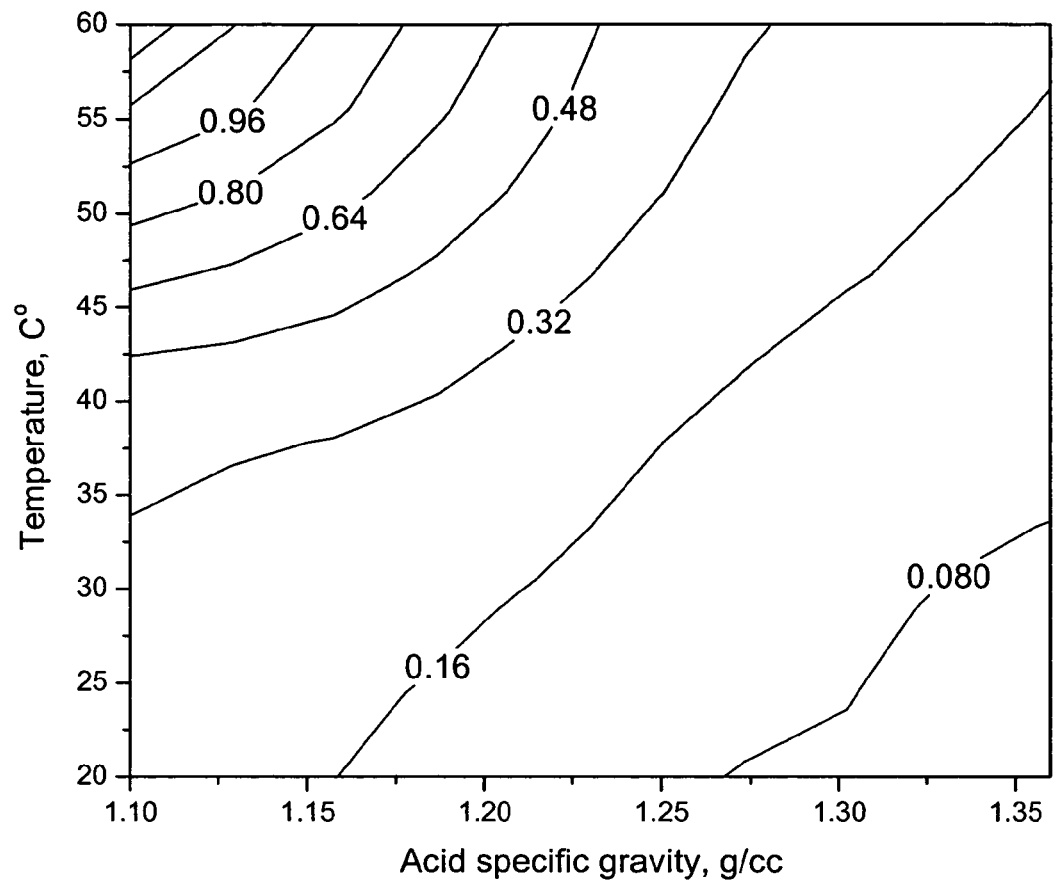
FIG. 8 is a graph showing Bi-ion leaching for a VRLA battery separator formed of a certain embodiment of the glass fiber compositions.

Tests showed that an embodiment of the battery separator made from 08UAC glass fibers (Composition 1, Table 3) had surprisingly superior performance. The Bi-ion leaching constant (in ng/cm²h) for this embodiment of glass fiber compositions as a function of acid specific gravity and temperature is shown in FIG. 8.

FIGS. 2A–2D show the Bi ion concentrations in the leachates of particular glass fiber compositions after 20 hour soaks in sulfuric acid solutions at the following specific gravities: (FIG. 2A) 1.1 gr/cm³; (FIG. 2B) 1.25 g gr/cm³, (FIG. 2C) 1.3 gr/cm³; and (FIG. 2D) 1.35 gr/cm³. A leached Bi ion concentration of from about 0.01 wt. % to about 0.06 wt. %, when bismuth is added to positive and negative plates, gave significant improvement in cycle life under deep cycling or partial state-of-charge cycling, but with low rate (current<1C). Leaching constants for Bi ions for certain of the embodiments of the disclosed glass fiber compositions under the above-listed conditions are shown in Table 17.

Figure 3:
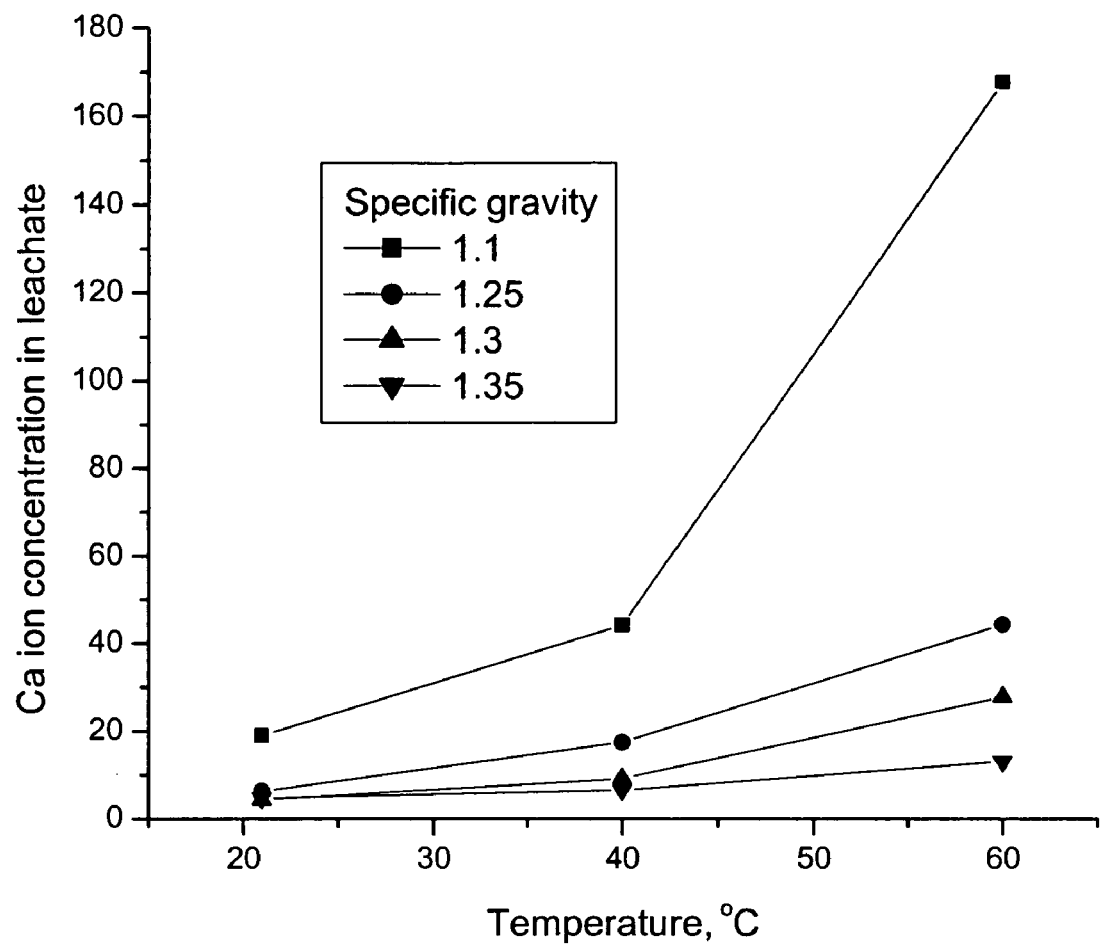
FIG. 3 is a graph illustrating calcium oxide ion concentration in leachates of particular glass fiber compositions soaked in sulfuric acid baths at various concentrations and at particular temperatures.

In general, the leached ion concentration in the electrolyte is proportional to the temperature and inversely proportional to the acid concentration. The typical ion concentration plotted against temperature for different specific gravity sulfuric acid solutions is shown in FIG. 3. The graph of FIG. 3 shows the resulting Ca ion concentration for a mat (UDC) formed of the C-4 (Table 3) glass composition after 20-hour soaks in sulfuric acid solutions having specific gravities of 1.1 gr/cm³, 1.25 g gr/cm³, 1.3 gr/cm³, and 1.35 gr/cm³.

Figure 5:
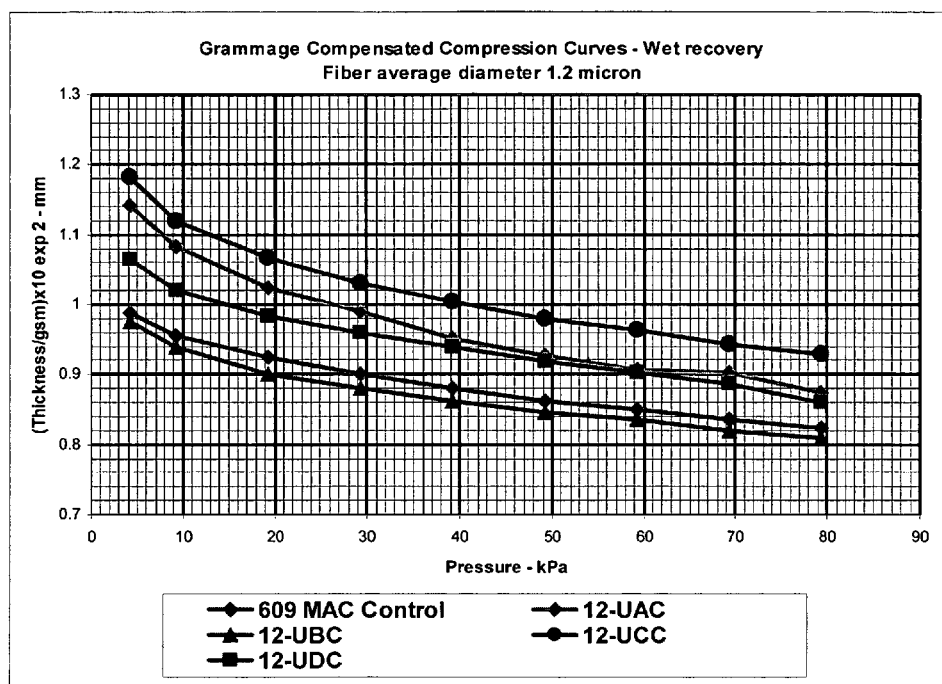
FIG. 5 is a graph showing compression curves for various glass fiber mats formed of various glass compositions.
Figure 6:
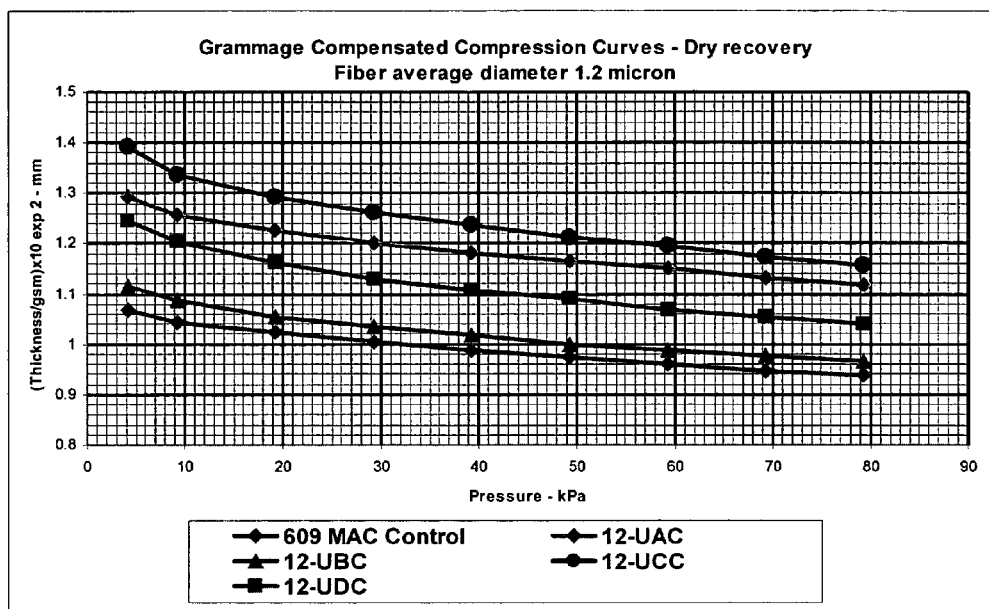
FIG. 6 is a graph showing compression curves for various glass fiber mats formed of various glass compositions.

An important physical property of a battery separator is media (i.e., glass fiber mat) compression recovery. All glass fiber media has been tested for both wet and dry recovery from compression. As shown in FIGS. 5 and 6, when comparing compression recovery curves for the 1.4 µm media made from embodiments of the disclosed glass fiber compositions reveals that the disclosed glass fiber compositions have better or at least equivalent performance as do the control (609 MAC) fibers currently available for use in separator manufacturing. Surprisingly superior results were obtained for the separators made from glass fiber compositions C-1 (12-UAC) and C-2 (12-UCC), both in wet and dry conditions. As shown in FIG. 5, the advantages of the disclosed glass compositions for forming the 0.8 µm fiber media are less pronounced than for the disclosed 1.4 µm fiber media.

The disclosed glass fiber compositions also have suitable paper manufacturing properties and may be converted into a paper (nonwoven). A series of handsheets were made using particular embodiments of the disclosed glass fiber compositions and experimental pilot machine paper trials using the various grades of fiber were performed. During the paper manufacturing process, glass fibers undergo stresses and strains from various pulpers and mixers. If a glass fiber is not sufficiently durable the end paper manufactured from the fiber will not have sufficient strength or uniformity.

Handsheets were made at two different blend times and three different end pH values in a 12×12 in handsheet mold. A series of 11 separate pilot machine experiments were performed. Six runs of glass fiber targeted to have a fiber diameter of 0.8 microns were run. A control, a standard glass fiber sold to industry, identified as 408MCC (available from Fiber Manufacturing Corporation were also tested). Five runs using glass fiber with a targeted fiber diameter of 1.4 microns were also performed. The control was the industrially available fiber identified as 609MAC.

The experiment pilot machine has a manufacturing width at the former section of 29 inches. This allowed for a trim width between 24–26 inches of good paper at the reel. The former was a modified fourdrinier. Modification was at a slight incline at the forming section. The paper was dried over 17 steam dryer cans having diameters of 36 inches, and then wound onto a reel spool. The glass fibers were prepared using a pulper where each batch included adding two 50 pound bags of glass fiber to the pulper having clean, filtered water adjusted to a pH modified to an acid condition in the about 2 to about 3 pH range using sulfuric acid. Each batch, after the glass fibers and 400 gallons of water were added, was mixed for seven minutes, after which the pulped glass fiber was pumped to a holding tank with an additional 1200 gallons of clean, filtered water. The fiber was then pumped to the paper machine and was further diluted with water. The dilution water was about 2-times the volume of the stock flow. Various minor adjustments where made for each run to adjust the end product weight and thickness as known to persons skilled in the papermaking art. Table 12 identifies the various trials and the glass fiber composition embodiments tested.

TABLE 12

| Trial Number | Control | Glass Fiber Diameter | Glass Fiber Grade Code | Glass Fiber Composition from Table 3 | Bale Serial Number | Machine Wire Speed, FPM |
| --- | --- | --- | --- | --- | --- | --- |
| PL082403C | Yes | 1.4 | 609M A C | M-glass | 1c190178/1C190181 | 25 |
| PL082403D | NO | 1.4 | 12-UAC | Composition 1 | bale 6/7 | 28 |
| PL081403E | NO | 1.4 | 12-UBC | Composition 3 | BALE 1/2 | 24 |
| PL082003A | NO | 1.4 | 12-UCC | Composition 2 | bale 4/5 | 30 |
| PL082003B | NO | 1.4 | 12-UDC | Composition 4 | BALE 1/5 | 29 |
| PL081303B | YES | 0.8 | 408 M CC | M-glass | 3A234576/3A234577 | 23 |
| PL081303C | NO | 0.8 | 08-UAC | Composition 1 | BALE 2/3 | 27 |

TABLE 12-continued

| Trial Number | Control | Glass Fiber Diameter | Glass Fiber Grade Code | Glass Fiber Composition from Table 3 | Bale Serial Number | Machine Wire Speed, FPM |
|---|---|---|---|---|---|---|
| PL081303D | NO | 0.8 | 08-UDC | Composition 4 | BALE ⅔ | 24 |
| PL081303 | NO | 0.8 | 08-UEC | Composition 5 | BALE ⅔ | 26 |
| PL081403A | NO | 0.8 | 08-UCC | Composition 2 | BALE ⅔ | 25 |
| PL081403B | NO | 0.8 | 0.8-UDC | Composition 4 | BALE ⅔ | 25 |

Figure 7:
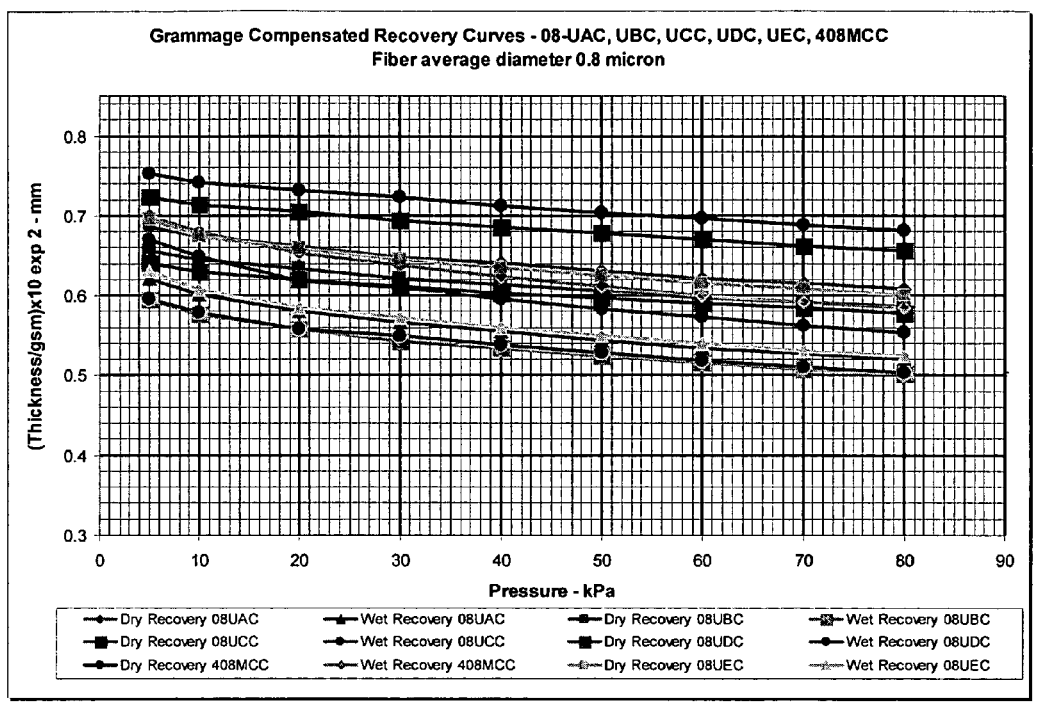
FIG. 7 is a graph showing compression curves for various glass fiber mats formed of various glass compositions.

The resulting tested property values for the handsheets are shown in Tables 15 and 16 and FIGS. 5–7. The data shows that the handsheets formed from the glass fiber compositions disclosed and tested had equivalent or better physical properties than the reference control.

As discussed above, the glass fiber compositions are also useful for forming filter media (i.e., the disclosed filter media). In evaluating the suitability of the glass compositions for forming filtration media for applications such as ASHRAE, HEPA and ULPA filtration media, a series of filtration tests were performed. Media made of conventional glass fibers were formed on the pilot machine reference above. Media made using 0.8 μm fibers made from embodiments of the disclosed glass compositions had relatively high air resistance (143 mm $H_2O$ at 5.33 cm/sec face velocity). Media made using 1.4 μm fibers had air resistance values in the mid 40's mm $H_2O$, which are equivalent to those values possessed by ULPA media. Testing on the 1.4 μm fibers was performed using a model 8160 Certitest from TSI using a cold DOP aerosol to test the filter media and the results are set forth below.

Statistical analysis shows differences in gamma values (wherein gamma is defined as –[log(penetration/100)/resistance]*100) between certain of the samples (12UBC had lower gamma than 12UAC, 12UCC, and 609MAC). There was a correlation between air resistance of the media sample and gamma (lower gamma at higher air resistance) that may explain statistical differences between the filter media tested. The U fiber chemistry results in air filtration performance equivalent to that of the M glass chemistry. The data in Table 13 was obtained using a model 8160 Certitest from TSI using a cold DOP aerosol to change the filter media. The glass filter media compositions disclosed in Table 13 correspond with those compositions set forth above in Table 12.

TABLE 13

| Composition Sample | Glass Penetration, % | Resistance, mm $H_2O$ | Flow rate, l/min | gamma |
|---|---|---|---|---|
| 12UAC | 0.0065382 | 41.36 | 32.11 | 10.1174 |
| 12UAC | 0.0043696 | 41.90 | 32.13 | 10.4047 |
| 12UAC | 0.0060510 | 41.25 | 32.08 | 10.2259 |
| 12UAC | 0.0077080 | 40.81 | 32.16 | 10.0786 |
| 12UAC | 0.0052723 | 42.16 | 32.09 | 10.1471 |
| 12UAC | 0.0048622 | 41.77 | 32.13 | 10.3260 |
| 12UBC | 0.0024000 | 47.71 | 32.09 | 9.6831 |
| 12UBC | 0.0028499 | 48.90 | 32.05 | 9.2948 |
| 12UBC | 0.0019277 | 47.45 | 32.07 | 9.9367 |
| 12UBC | 0.0019265 | 48.39 | 32.17 | 9.7442 |
| 12UBC | 0.0023573 | 48.81 | 32.09 | 9.4808 |
| 12UCC | 0.0046054 | 40.04 | 32.11 | 10.8310 |
| 12UCC | 0.0065212 | 40.11 | 32.12 | 10.4355 |
| 12UCC | 0.0076465 | 40.53 | 32.05 | 10.1568 |
| 12UDC | 0.0072436 | 44.27 | 32.15 | 9.3518 |
| 12UDC | 0.0049795 | 44.01 | 32.06 | 9.7769 |
| 12UDC | 0.0026711 | 43.38 | 32.16 | 10.5424 |
| 12UDC | 0.0031465 | 44.67 | 32.05 | 10.0787 |

TABLE 13-continued

| Composition Sample | Glass Penetration, % | Resistance, mm $H_2O$ | Flow rate, l/min | gamma |
|---|---|---|---|---|
| 609MAC | 0.0033375 | 43.69 | 32.11 | 10.2462 |
| 609MAC | 0.0022429 | 44.63 | 32.15 | 10.4172 |
| 609MAC | 0.0046648 | 42.90 | 32.03 | 10.0960 |
| 609MAC | 0.0027671 | 43.30 | 32.09 | 10.5265 |

Glass fibers were made from glass compositions C-1, C-2, C-3, C-4 to have an average diameter of about 1.4 μm ("12 series" as shown in Tables 12 and 13) and from glass compositions C-1, C-2, C-3, C-4 and C-5 (compositions as disclosed in Table 3) to have an average diameter of about 0.8 μm ("08 series" as shown in Tables 12 and 13). Fiber filter media were formed from these glass fiber compositions. The major properties of the disclosed fiber media are shown in Tables 15 and 16. Referring to the 1.4 μm filter media test results, the disclosed filter media made out of disclosed glass fiber compositions compared with the control, the disclosed media possess higher tensile strength and superior puncture endurance. The same disclosed media compared with the control show equivalent wicking, JIS absorption, and Frazier permeability properties. Certain embodiments of the media (those formed of glass compositions C-1, C-2, C-3) show especially high total tensile and grammage compensated puncture test values both in wet and dry conditions. Standard tensile strength, puncture tests, and other test methods noted herein were followed, i.e., methods approved by the Battery Council International, BCI Battery Technical Manual, BCIS-03B, Rev. APR01, pp. 3–92 (2002–04), which is herein incorporated by reference.

Referring to the 0.8 μm filter media test results, the disclosed filter media made out of disclosed glass fiber compositions compared with the 408 glass media control, the disclosed media have slightly better tensile and puncture endurance. The disclosed media also possess improved wicking in water and acid solutions. The embodiment of filter media made from the C-3 glass composition has surprisingly superior properties—all results set forth in Tables 15 and 16.

TABLE 14

| Glass Composition | Fiberization Temperatures Log 3 Temp, °C. |
|---|---|
| Low boron EF filter glass | 1212 |
| Evanite Fiber Filter glass | 1167 |
| JM 475 | 1085 |
| Evanite Fiber M-glass | 1156 |
| JM 253 | 1060 |
| C-2 (see Table 3) | 1072 |

TABLE 15

Media properties (fiber average diameter 0.8 μm)

| TESTS | 408 MCC Control | 08-UAC | 08-UBC | 08-UCC | 08-UDC | 08-UEC |
|---|---|---|---|---|---|---|
| Grammage gsm | 247 | 205 | 240 | 207 | 220 | 213 |
| Thickness @10 kPa mm | 1.78 | 1.4 | 1.58 | 1.47 | 1.42 | 1.44 |
| @20 kPa mm | 1.62 | 1.26 | 1.41 | 1.34 | 1.27 | 1.27 |
| @50 kPa mm | 1.42 | 1.11 | 1.23 | 1.19 | 1.11 | 1.1 |
| Density @10 kPa gsm/mm | 139 | 146 | 152 | 141 | 155 | 148 |
| Tensile MD (as is) lb/in | 4.6 | 3.1 | 3.6 | 3.4 | 3.7 | 3.3 |
| Tensile CD (as is) lb/in | 3.4 | 2.2 | 2.6 | 2.3 | 2.5 | 2.3 |
| Elongation MD (as is) % | 2.8 | 2.2 | 2.1 | 3.7 | 2.5 | 3.2 |
| Elongation CD (as is) % | 5.2 | 4.7 | 5.2 | 6 | 5.6 | 5.7 |
| TEA MD (as is) lb/in$^2$ | 0.09 | 0.05 | 0.05 | 0.09 | 0.06 | 0.1 |
| TEA CD (as is) lb/in$^2$ | 0.12 | 0.08 | 0.1 | 0.1 | 0.1 | 0.09 |
| BET Surface Area g/m$^2$ | 2.2 | 2.4 | 2.3 | 2.4 | 2.3 | 2.1 |
| PMI Min. Pore μm | 0.97 | 0.91 | 0.98 | 0.98 | 0.92 | 0.9 |
| Max Pore μm | 11.3 | 10.7 | 10.5 | 11.4 | 10.9 | 11.5 |
| Mean Flow Pore μm | 1.93 | 1.79 | 1.79 | 2 | 1.67 | 1.98 |
| Max Pore μm | 13.3 | 12.2 | 12.1 | 13.4 | 12.9 | 13.6 |
| Frazier Permeability CFM | 1.26 | 1.35 | 1.19 | 1.4 | 1.28 | 1.53 |
| Tabor Stiffness MD g/cm | 35.5 | 32.83 | 33.5 | 32.7 | 32.33 | 31.33 |
| Tabor Stiffness CD g/cm | 33.5 | 30.83 | 30.83 | 31 | 30.67 | 30 |
| JIS Water Wicking sec/10 cm | 193 | 199 | 202 | 187 | 194 | 190 |
| JIS Acid Wicking sec/10 cm | 406 | 431 | 447 | 426 | 432 | 444 |
| Mullen DRY psig | 5.8 | 5.5 | 5.2 | 5.1 | 6.2 | 5.2 |
| Mullen WET psig | 2.9 | 2.6 | 2.4 | 3.3 | 3.2 | 2.8 |
| Puncture Test Dry kg | 0.859 | 0.583 | 0.716 | 0.645 | 0.62 | 0.624 |
| Puncture Wet Dry kg | 0.649 | 0.41 | 0.53 | 0.483 | 0.511 | 0.51 |
| JIS Absorption % | 90.6 | 90.4 | 90.1 | 90.5 | 90.1 | 90 |
| Moisture Loss % | 0.22 | 0.361 | 0.359 | 0.437 | 0.448 | 0.498 |
| Ignition Loss % | 0.8 | 0.93 | 0.79 | 0.6 | 0.58 | 0.33 |
| Grammage compensated puncture test (dry) | 3.47 | 2.85 | 2.95 | 3.11 | 2.82 | 2.93 |
| Grammage compensated puncture test (wet) | 2.63 | 2 | 2.21 | 2.33 | 2.33 | 2.39 |

TABLE 16

Media properties (fiber average diameter 1.4 μm)

| | Control 609MAC Part A inside | 12-UAC inside | 12-UBC inside | 12-UCC inside | 12-UDC inside |
|---|---|---|---|---|---|
| Grammage (gsm) | 229 | 206 | 233 | 205 | 210 |
| Thickness @ 10 kPa (mm) | 1.402 | 1.47 | 1.49 | 1.525 | 1.404 |
| @ 20 kPa (mm) | 1.246 | 1.291 | 1.313 | 1.303 | 1.211 |
| @ 50 kPa (mm) | 1.110 | 1.17 | 1.153 | 1.138 | 1.058 |
| Density @ 10 kPa (gsm/mm) | 163.6 | 140.4 | 156.2 | 134.5 | 144.5 |
| MD Tensile (#/in) | 2.04 | 1.95 | 2.57 | 2.05 | 2.11 |
| CD Tensile (#/in) | 1.39 | 1.27 | 1.91 | 1.47 | 1.45 |
| MD Elong. (%) | 3.22 | 3.32 | 3.07 | 3.53 | 3.72 |
| CD Elong. (%) | 4.80 | 4.64 | 5.41 | 6.88 | 7.19 |
| MD TEA (#/in$^2$) | 0.05 | 0.05 | 0.06 | 0.05 | 0.05 |
| CD TEA (#/in$^2$) | 0.05 | 0.04 | 0.08 | 0.07 | 0.08 |
| BET SA (m/g$^2$) | 1.3 | 1.4 | 1.3 | 1.4 | 1.3 |
| PMI: min pore | 1.62 | 1.52 | 1.60 | 1.67 | 1.72 |
| Max pore | 16.49 | 15.49 | 14.84 | 15.36 | 15.70 |
| mean flow pore | 3.50 | 3.33 | 4.01 | 4.40 | 4.35 |
| Taber Stiffness MD (g/cm) | 22.50 | 22.75 | 27.33 | 20.67 | 19.50 |
| Taber Stiffness CD (g/cm) | 17.00 | 18.33 | 21.00 | 17.00 | 14.08 |
| Max Pore (in) | 18.8 | 18.3 | 18.9 | 17.7 | 18.4 |
| Max Pore (μm) | 18.5 | 19.1 | 18.4 | 19.7 | 18.9 |
| Frazier (CFM) | 4.34 | 4.49 | 3.98 | 4.70 | 4.31 |
| JIS Water Wicking (sec/10 cm) | 159 | 217 | 159 | 157 | 150 |
| JIS Acid Wicking (sec/10 cm) | 371 | 322 | 392 | 398 | 395 |
| water/acid wicking | 0.428 | 0.673 | 0.405 | 0.394 | 0.379 |
| JIS Absorption (%) | 91.1 | 92.1 | 91.1 | 92.8 | 92.1 |
| Mullen (psig) | 2.00 | 3.00 | 3.17 | 2.75 | 3.33 |
| Mullen Wet (psig) | 1.67 | 2.33 | 2.83 | 2.67 | 3.17 |
| Moisture Loss (%) | 0.097 | 0.093 | 0.091 | 0.088 | 0.100 |
| LOI (%) | 0.41 | 0.56 | 0.49 | 0.53 | 0.55 |

TABLE 16-continued

Media properties (fiber average diameter 1.4 μm)

|  | Control 609MAC Part A inside | 12-UAC inside | 12-UBC inside | 12-UCC inside | 12-UDC inside |
|---|---|---|---|---|---|
| Puncture Test (kg) | 0.325 | 0.472 | 0.557 | 0.517 | 0.393 |
| Puncture Test Wet (kg) | 0.229 | 0.469 | 0.469 | 0.450 | 0.393 |
| Grammage compensated puncture test (dry) | 1.42 | 2.29 | 2.39 | 2.52 | 1.87 |
| Grammage compensated puncture test (wet) | 1 | 2.28 | 2.01 | 2.2 | 1.87 |

TABLE 17

Bi-ion leaching constant for C-1, 2, 3, 4, 5 glass fiber compositions

| | | Leaching constants, ng/h * cm² | | | | |
|---|---|---|---|---|---|---|
| Acid density, g/cc | Temperature, °C. | UAC | UBC | UCC | UDC | UEC |
| 1.1 | 21 | 0.21 | 1.79 | 0.31 | 1.72 | 1.38 |
|  | 40 | 0.36 | 3.23 | 0.48 | 2.78 | 3.10 |
|  | 60 | 1.40 | 8.94 | 1.25 | 8.16 | 10.55 |
| 1.25 | 21 | 0.08 | 0.69 | 0.16 | 0.62 | 0.88 |
|  | 40 | 0.17 | 1.52 | 0.22 | 1.28 | 1.46 |
|  | 60 | 0.38 | 3.05 | 0.41 | 2.42 | 3.24 |
| 1.3 | 21 | 0.08 | 0.56 | 0.12 | 0.47 | 0.42 |
|  | 40 | 0.11 | 1.06 | 0.16 | 0.76 | 0.83 |
|  | 60 | 0.28 | 2.20 | 0.29 | 1.69 | 1.90 |
| 1.35 | 21 | 0.07 | 0.54 | 0.08 | 0.43 | 0.49 |
|  | 40 | 0.10 | 0.71 | 0.14 | 0.76 | 0.90 |
|  | 60 | 0.17 | 1.28 | 0.20 | 0.98 | 1.16 |

TABLE 18

Bi-ion leaching constants for C1–5 glass fiber compositions at 116° C. in 1.26 s.g. $H_2SO_4$

| Fiber type and composition | Leaching constant, ng/h * cm² |
|---|---|
| 08UAC | 33.77 |
| 08UBC | 197.84 |
| 08UCC | 31.74 |
| 08UDC | 188.61 |
| 08UEC | 241.37 |
| 408M | 0.07 |
| 12UAC | 38.81 |
| 12UCC | 26.61 |
| 12UDC | 194.92 |

The disclosed glass compositions and glass fiber compositions also are suitable for particular insulation applications such as radiation shielding and specialty filtration purposes. Bismuth oxide is one of the heaviest, non-radioactive oxides. Introduction of heavy metal oxides into glass can significantly increase the γ (gamma) and X-ray absorption ability of the glass composition. The X-ray attenuation effects for certain embodiments of the disclosed glass fiber compositions has been determined by introducing one or more layers of glass fiber mats of different glass composition. Glass fiber media was made out of fibers with average diameter 0.8 micron. The sample media basis weight is about 170 g/m². The glass fiber layers were positioned between an X-ray source and a photographic plate. Samples have been exposed to X-rays with energy 22 kV in the closed camera using a Micro 50, available from Microfocus Imaging Company. The distance between the X-ray source and the sample was about 25 cm.

The attenuation effect of each glass fiber composition was determined by measuring the amount of transmitted visible light through the X-ray image, and is listed in Table 9C. $I_o$ is the intensity of the X-ray energy on the detector without any media placed between the X-ray source and the detector; I is intensity of the X-ray energy on the detector with the media placed between the X-ray source and the detector. Attenuation coefficients were calculated according to a well-known National Institute of Standards (NIST) test method as disclosed in, e.g., ICRU (1984), *Stopping Powers for Electrons and Positrons*, Report 37 of the International Commission on Radiation Units and Measurements (Bethesda, Md.). 2) Seltzer, S. M. (1993), Calculation of Photon Mass Energy-Transfer and Mass Energy-Absorption Coefficients, Rad. Res. 136, 147–170, which are both incorporated herein by reference and http://physics.nist.gov/PhysRefData/XrayMassCoef and more specifically http://physics.nist.gov/PhysRefData/XrayMassCoef/chap2.html, which are incorporated herein by reference.

The experimental and calculated data provided is for one-layer media samples and for five-layer glass fiber media for samples of each of the tested composition. The compositions tested and listed in Table 9C correspond to those compositions set forth in Tables 3 and 5. The presence of bismuth oxide in the particular disclosed glass compositions increases the X-ray attenuation ability of the glass fiber compositions. Typical glass fiber compositions used for attenuation of X-rays contain high amounts of lead oxide. Since lead and its compounds are poisonous and environmentally detrimental, the absence of significant amounts of lead and lead compounds in the presently disclosed glass fiber compositions make the disclosed glass compositions desirably nontoxic and environmentally friendly as compared to available X-ray shield glass fiber materials. Additionally, bismuth atoms as compared to lead atoms have enhanced ability to attenuate X-rays and γ rays. As shown in the results set forth in Table 9C, the attenuation effect of the disclosed glass compositions may increase with glass fibers having about 9 wt. percent or greater bismuth oxide content.

Particularly good results were obtained with glass compositions numbers 3 and 5 (see Tables 3 and 5 above for the concentration of components of these compositions and Table 9C for attenuation results). Glass fiber layers formed of these particular glass compositions increased the X-ray attenuation from 3 to 5 times as compared to glass fiber layer samples formed of conventional M-glass. Three to four layers of glass fibers formed of glass compositions 3 and 5 completely attenuated the X-rays.

There are a number of potential applications for X-ray shields including glass fiber compositions as disclosed herein. For example, apparel shielding, such as an apron one drapes on a patient when taking an X-ray. X-ray shield apparel made with glass fibers disclosed herein would provide a great weight reduction as compared to current X-ray shield apparel and would lower or eliminate the need to include lead in such apparel. Thus, disposal of such apparel is simpler and less expensive as compared to conventional X-ray shielding apparel. Another example X-ray shield using the glass fiber compositions disclosed herein may comprise a veil mat to be laminated or otherwise attached to a hardboard or other substrate for constructing shielded rooms to eliminate exposure to X-rays in, e.g., dentist offices. Further example uses include packing and/or insulation material in X-ray equipment or for adjacent such tooling or apparatus. Such material could be used for enhanced shield technology for, e.g., military applications such as a skin or reinforcing fiber in metal or plastic or for use in military clothing to shield individuals from harmful X-rays. Such material could be used to form protective covers or containers for film to protect film from harmful X-ray effects from, for example, airport security screening systems.

Whereas the disclosed glass compositions, glass fibers, glass fiber battery separators, filter media, paper product, and radiation shielding media, and applications for the same have been described with reference to multiple embodiments and examples, it will be understood that the invention is not limited to those embodiments and examples. On the contrary, the invention is intended to encompass all modifications, alternatives, and equivalents as may be included within the spirit and scope of the invention as defined by the appended claims and as disclosed in the specification.

We claim:

1. A glass fiber mat comprising:
a mat of glass fibers comprising from about 0.5 to about 30 weight percent bismuth oxide and from about 0.1 to about 3 weight percent $ZrO_2$.

2. A glass fiber mat comprising:
a mat glass fibers comprising from about 9 to about 15 weight percent bismuth oxide and from about 50 to about 75 weight percent silicon oxide.

3. A glass fiber mat comprising:
at least one mat formed of glass fibers wherein the glass fibers comprise from about 0.5 to about 30 weight percent bismuth oxide, from about 56 to 69 weight percent silicon oxide, substantially no boric oxide, from about 0 to about 2 weight percent barium oxide, from about 9 to about 20 weight percent $R_2O$, wherein $R_2O$ is a mixture of sodium oxide and potassium oxide, from about 1 to 5 weight percent alumina, from about 3 to about 7 weight percent calcium oxide, from about 1 to about 5 weight percent magnesium oxide, from about 0 to about 5 weight percent zinc oxide, and from about 0 to about 1 weight percent fluorine.

4. The glass fiber mat of claim 3, wherein the glass fiber mat forms at least a portion of a filter.

5. A glass fiber mat comprising:
at least one mat formed of glass fibers wherein the glass fibers comprise from about 0.5 to about 30 weight percent bismuth oxide, substantially no boric oxide, from about 0 to about 2 weight percent barium oxide, from about 9 to about 20 weight percent $R_2O$, wherein $R_2O$ is a mixture of sodium oxide and potassium oxide, from about 1 to 5 weight percent alumina, from about 3 to about 7 weight percent calcium oxide, from about 1 to about 5 weight percent magnesium oxide, from about 0 to about 5 weight percent zinc oxide, and from about 0 to about 1 weight percent fluorine.

6. A glass fiber mat comprising:
at least one mat formed of glass fibers wherein the glass fibers comprise from about 9 to about 15 weight percent bismuth oxide, from about 56 to 69 weight percent silicon oxide, from about 0.01 to about 2 weight percent zinc oxide, from about 2 to about 4 weight percent $Al_2O_3$, less than about 0.0001 weight percent lead, and wherein the glass fiber mat is capable of absorbing at least about 90 percent of X-rays emanating from an X-ray source having an energy level of about 22kV and such source being position about 25 cm from the glass fiber mat, when the mat of glass fibers has a basis weight of about 170 $g/m^2$.

7. The glass fiber mat of claim 6, wherein the glass fibers are woven.

8. The glass fiber mat of claim 6, wherein the glass fiber mat further comprises the mat formed into the shape of an apron or blanket, the glass fiber mat being capable of being draped over a person as an X-ray shield for use during X-ray exposure.

9. The glass fiber mat of claim 6, wherein the glass fiber mat further comprises a veil mat attached to a rigid substrate for constructing an X-ray shielded room.

10. The glass fiber mat of claim 6, wherein the glass fiber mat further comprises a veil mat attached to hardboard.

11. The glass fiber mat of claim 6, wherein the glass fiber mat further comprises the mat attached to or mixed with a reinforcement material.

12. The glass fiber mat of claim 11, wherein the reinforcement material is metal, plastic, rubber, ceramic, gypsum, or mixtures thereof.

13. The glass fiber mat of claim 6, wherein the glass fiber mat further comprises the at least one mat being covered with or attached to fabric to form apparel.

14. The glass fiber mat of claim 6, wherein the glass fiber mat comprises insulation material in X-ray equipment or packing material for packaging X-ray equipment.

15. The glass fiber mat of claim 6, wherein the glass fiber mat comprises at least a portion of a container capable of holding film and protecting the film from X-rays emitted by a security screening system.

16. A glass fiber mat comprising:
at least one mat formed of glass fibers wherein the glass fibers comprise from about 0.5 to about 30 weight percent bismuth oxide, from about 0.01 to about 2 weight percent zinc oxide, from about 2 to about 4 weight percent $Al_2O_3$, and having an average diameter of about 0.8μm;
wherein the glass fibers have a leaching constant for $Bi_2O_3$ of from about 7 $ng/cm^2h$ to about 650 $ng/cm^2h$ when 1 gram of the glass fibers is boiled for three hours in 100 ml of $H_2SO_4$ having a specific gravity of 1.26 $g/cm^3$; and
wherein the glass fiber mat forms at least a portion of a filter.

17. The glass fiber mat of claim 16, the glass fibers further comprising from about 56 to 69 weight percent silicon oxide.

18. The glass fiber mat of claim 17, wherein the glass fibers have a softening point of less than about 703° C.

19. The glass fiber mat of claim 17, wherein the glass fibers have an average diameter of about 1.4 μm, a basis weight of from about 203 to about 236 $g/m^2$ and have a total tensile strength/gsm of greater than about 0.016.

20. The glass fiber mat of claim 17, wherein the glass fibers further comprise from about 9 to about 15 weight percent bismuth oxide, have an average diameter of about 1.4 μm, a basis weight of from about 125 to about 145 lbs/3000 ft.$^2$ and a puncture endurance of greater than about 0.4 kg when dry and greater than 0.3 kg when wet.

21. The glass fiber mat of claim 16, wherein the glass fibers include from about 0 to about 1 weight percent boric oxide.

22. The glass fiber mat of claim 17, wherein the glass fibers form a filter having a Kdis value of from about 50 to about 150 ng/hcm$^2$.

23. The glass fiber mat of claim 17, wherein the glass fibers form a filter having a density of from about 2.5 to about 2.85.

\* \* \* \* \*

UNITED STATES PATENT AND TRADEMARK OFFICE
CERTIFICATE OF CORRECTION

PATENT NO. : 7,144,633 B2 Page 1 of 1
APPLICATION NO. : 10/896432
DATED : December 5, 2006
INVENTOR(S) : George Zguris et al.

It is certified that error appears in the above-identified patent and that said Letters Patent is hereby corrected as shown below:

Title Page of the Patent:
Page 1, Item [60] Related U.S. Application Data should be added and should read --Continuation-in-part of application No. 10/630,546, filed on Jul. 29, 2003, now Pat. No. 7,160,824, which claims benefit of provisional application No. 60/399,583, filed on July 29, 2002, and continuation-in-part of PCT/US03/23695, filed on July 29, 2003.--

In the Specification:
Col. 5, line 49, "or other amounts" should be --or other ranges and amounts--
Col. 6, line 46, "about 110° C" should be --about 10° C--
Col. 16, line 6, "0) The" should be --1) The--
Col. 22, line 24 should be deleted
Col. 27, Table 15, "Max Pore μm" should not be indented above "Frazier Permeability,"
Col. 30, lines 35-36, "/Phys-RefData/" should be --/PhysRefData/--

In the Claims:
Claim 2 (col. 31, line 41), "mat glass" should be --mat of glass--
Claim 16 (col. 32, line 52), "$Bi_{2O3}$" should be --$Bi_2O_3$--

Signed and Sealed this

Seventeenth Day of February, 2009

JOHN DOLL
*Acting Director of the United States Patent and Trademark Office*